United States Patent
Woo

(10) Patent No.: US 7,680,788 B2
(45) Date of Patent: *Mar. 16, 2010

(54) MUSIC SEARCH ENGINE

(76) Inventor: Mark Woo, 9701 Turtledove Ave., Fountain Valley, CA (US) 92708

( * ) Notice: Subject to any disclaimer, the term of this patent is extended or adjusted under 35 U.S.C. 154(b) by 952 days.

This patent is subject to a terminal disclaimer.

(21) Appl. No.: 10/637,377

(22) Filed: Aug. 8, 2003

(65) Prior Publication Data

US 2004/0030691 A1 Feb. 12, 2004

Related U.S. Application Data

(63) Continuation of application No. 09/478,696, filed on Jan. 6, 2000, now Pat. No. 6,678,680.

(51) Int. Cl.
G06F 17/30 (2006.01)
G10H 7/00 (2006.01)

(52) U.S. Cl. .................... 707/6; 707/3; 84/609

(58) Field of Classification Search .................... 707/6, 707/3; 84/602, 609, 618
See application file for complete search history.

(56) References Cited

U.S. PATENT DOCUMENTS

| | | | |
|---|---|---|---|
| 5,146,833 A * | 9/1992 | Lui ........................... 84/462 |
| 5,261,087 A | 11/1993 | Mukaino | |
| 5,455,379 A | 10/1995 | Kim et al. | |
| 5,616,876 A | 4/1997 | Cluts | |
| 5,736,666 A | 4/1998 | Goodman et al. | |
| 5,739,451 A | 4/1998 | Winksy et al. | |
| 5,756,915 A | 5/1998 | Matsuda | |
| 5,808,233 A | 9/1998 | Finkel et al. | |
| 5,864,078 A | 1/1999 | Koevering | |
| 5,864,868 A | 1/1999 | Contois | |
| 5,986,201 A | 11/1999 | Starr et al. | |
| 6,121,530 A | 9/2000 | Sonoda | |
| 6,188,010 B1 | 2/2001 | Iwamura | |
| 6,192,372 B1 | 2/2001 | Yamaura et al. | |

OTHER PUBLICATIONS

Ghias et al.; "Query By Humming—Musical Information Retrieval in an Audio Database"; ACM 1995; pp. 1-9.
McNab et al.; "Towards the Digital Music Library: Tune Retrieval from Acoustic Input"; ACM 1996; pp. 11-18.

* cited by examiner

*Primary Examiner*—Uyen T. Le
(74) *Attorney, Agent, or Firm*—Stetina Brunda Garred & Brucker

(57) ABSTRACT

A music search method for finding a desired song in a song database. The method comprises generating a difference sequence for each song in the song database by determining the relative difference between adjacent notes. Next, a note sequence is chosen for the song to be found within the song database. A difference argument is generated for the note sequence by determining the relative difference between adjacent notes. The difference argument for the note sequence and the difference sequence for each song in the song database is compared. The desired song is found if the difference argument for the note sequence corresponds to a portion of the difference sequence for the desired song, or if the net difference at the closest match position is within a set difference threshold.

3 Claims, 20 Drawing Sheets

| FIG. 2A |
|---------|
| FIG. 2B |

EXACT SEARCH SUBROUTINE

DISPLAY MATCHING HITS SUBROUTINE

CONVERT NOTES TO DIFFERENCE ARGUMENT SUBROUTINE

CONVERT NOTES TO FORMAT-1 SUBROUTINE

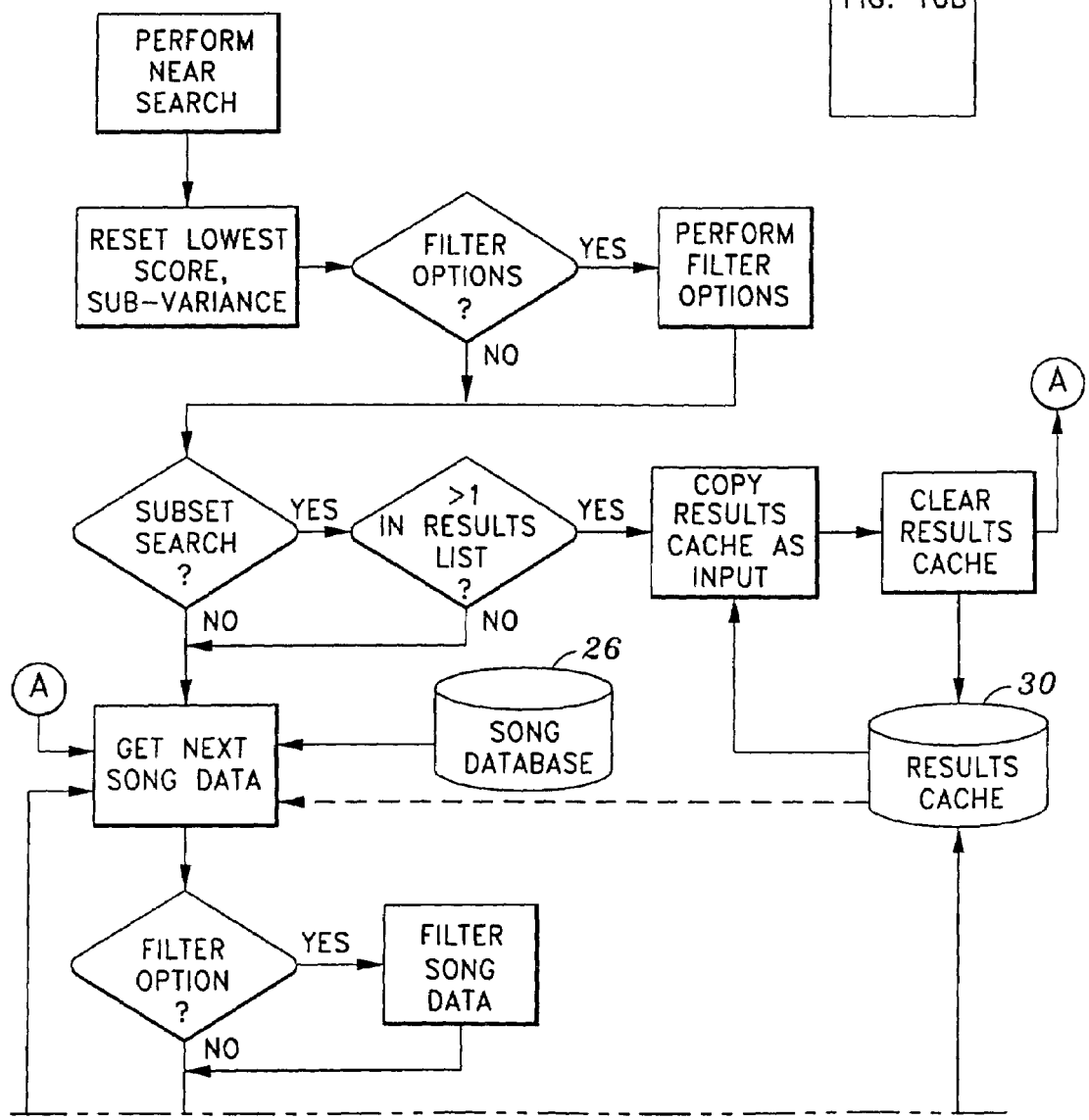

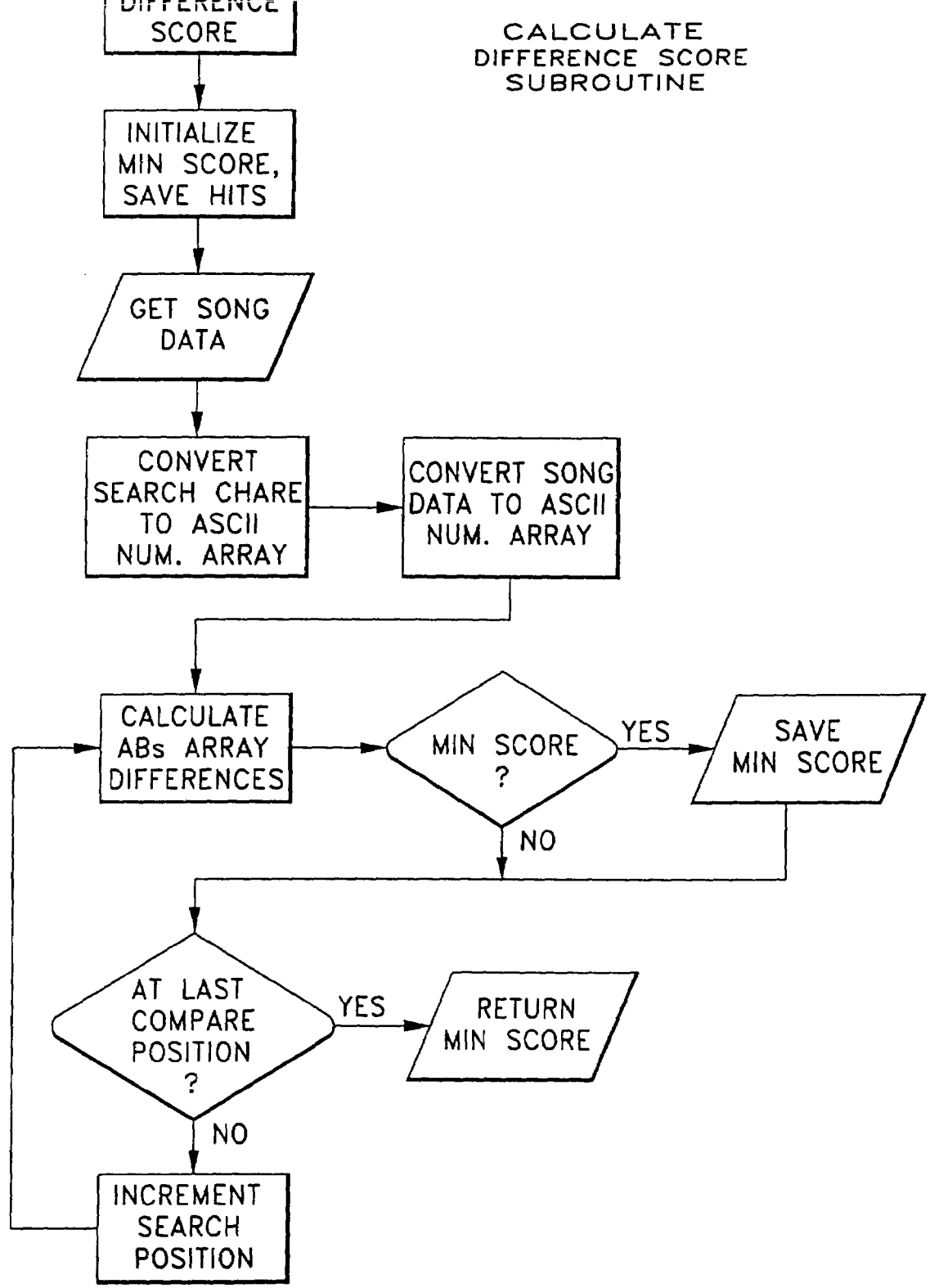

REDUCE MULTIPLE NOTES SUBROUTINE

ANALYZE DATABASE SUBROUTINE

KARAOKE APPLICATION

TRANSPOSE SONG CLIP SUBROUTINE

FIND TRANSPOSE VALUE SUBROUTINE

MUSIC SEARCH ENGINE

RELATED APPLICATIONS

The present application is a continuation of U.S. application Ser. No. 09/478,696 now U.S. Pat. No. 6,678,680 entitled MUSIC SEARCH ENGINE filed Jan. 6, 2000.

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to a method of searching for a song and more particularly to a simplified search method adapted for use on a computer.

As is well known, songs are composed of music and words. The music comprises the ordering of tones and sounds (i.e., notes) in succession to form temporal relationships that produce a composition having unity and continuity. Often times, a musician or music lover will know the tune (i.e., melody) of a song, yet not know the title, words, or music associated therewith. The musician or music lover would like to know the name of the song in order to find the sheet music for it and/or recordings of the desired song. In the prior art, if a music lover and/or musician knows the tune of the song, he/she has a difficult time in finding the title of the song.

In order to facilitate searching for songs, prior art computer systems have been designed which search for matches between notes entered by the searcher and the notes of the song. Typically, in the prior art, a song database is created by entering the notes comprising the music into a computer memory. The song is stored electronically wherein each note is exactly duplicated in the memory of the computer. In order to perform a search with the prior art system, the searcher enters a sequence of notes of the song into the computer, and the system will attempt to find a match between the entered notes and the notes in the database.

Prior art music search systems have been inadequate in that the music is encoded into the database in a fixed key. The database of the prior art music search engine comprises a note listing for each song. The note listing will be generated in the key of the song as written on the music or performed by the encoder. The prior art music search system searches for music corresponding identically to the notes entered by the user. Therefore, in order to find a song, the user must enter notes in the same key and the identical sequence as they were encoded into the song database. The search system will find songs that identically match the notes entered by the user. If the user enters notes in a different key, or makes a mistake in the value of a note, the search system will not find a match for the song. In order to find songs entered in a different key by the user, the prior art search system must either include a database of songs transposed into different keys or transpose the notes entered by the user into the key that the database songs are entered. Neither method is ideal because of the inefficiency of the music search. Specifically, if all songs are entered into the database in all possible keys, the system must search through many unnecessary song versions to find a match. Similarly, if the system converts the entered notes into all possible keys, the system must allocate resources to transpose the notes, and then perform multiple searches (i.e., one for each different key) In either case, the prior art search system will only produce the desired result if the user correctly enters a sequence of notes.

As described above, prior art music search systems require a large amount of computational resources, and as such are highly inefficient. They are also impractical due to the fact that various interpretations of different stylistic impressions of a song (during encoding) and imperfect recollection of a song's exact note sequences (during searching) are common and inhibiting factors. The present invention addresses the problems associated with the prior art music search systems by providing a key-independent music search engine operative to determine a match between the notes entered and the notes of a song using computational resources more efficiently. Additionally, the present invention provides a music search engine capable of finding the closest matches for songs, even if the entered note sequence contains errors. Furthermore, the present invention provides a music search engine that facilitates the analysis and categorization of music in a fast and efficient manner. The music search engine of the present invention additionally provides a system whereby songs found by the system may be transposed into a key selected by the user.

BRIEF SUMMARY OF THE INVENTION

In accordance with a preferred embodiment of the present invention, there is provided a music search method for finding a desired song in a song database. The method comprises generating a difference sequence for each song encoded in the song database by determining the difference between adjacent notes (the term 'difference' as used herein means the number of chromatic scale notes, each representing $\frac{1}{12}^{th}$ of an octave). Next, a note sequence is entered for the song to be found within the song database. A difference argument is generated for the note sequence by determining the difference between adjacent notes. The difference argument for the note sequence and the difference sequence for each song in the song database is compared. The desired song is found if the difference argument for the note sequence corresponds to a portion of the difference sequence for the desired song.

In the preferred embodiment, the difference between each adjacent note of the note sequence and each adjacent note of the songs in the song database are assigned a prescribed value. Accordingly, the differences between the prescribed values are compared in order to determine the closeness of the match between the two.

In the preferred embodiment, if an exact match between the note sequence and the songs in the song database does not occur, it is possible to determine a near match. A near match is determined when the difference argument varies from the difference sequence within a prescribed variance decided by the user. Additionally, the difference argument and the difference sequence may be filtered before comparison. In this respect, the multiple and/or artistic notes (as may occur in a 'jazzy' rendition of a song) in songs may be removed prior to comparison.

The note sequence to be searched may be entered into the computer with an input device. In this respect, the input device may be a keyboard and/or mouse of the computer. Alternatively, the input device may be a voice or MIDI instrument in electrical communication with the computer.

In accordance with the preferred embodiment there is additionally provided a method of encoding songs for searching. The method comprises generating a database of songs and then determining a difference sequence for each song. The difference sequences are stored such that they may be searched at a later time. Typically, the database is generated electronically, as well as the determining and storing of the difference sequences.

The present invention is ideally suited for determining structural attributes and patterns in music by first generating a difference sequence for each song contained within a song database. In the context of structural analysis of music, a 'difference sequence' may additionally be applied to relative changes in note duration (rhythm) as well as frequency. Next, the difference sequences may be analyzed to discover patterns within the music. Typically, the patterns are derived by comparing the differences between adjacent notes of the difference sequence. The identification of common structural attributes and patterns for a given subset of songs may be very useful in contributing to the understanding of why people like certain songs.

BRIEF DESCRIPTION OF THE SEVERAL VIEWS OF THE DRAWING

These as well as other features of the present invention will become more apparent upon reference to the drawings wherein:

FIGS. 2-19 are flowcharts depicting the operation of the present invention.

DETAILED DESCRIPTION OF THE INVENTION

Figure 1:
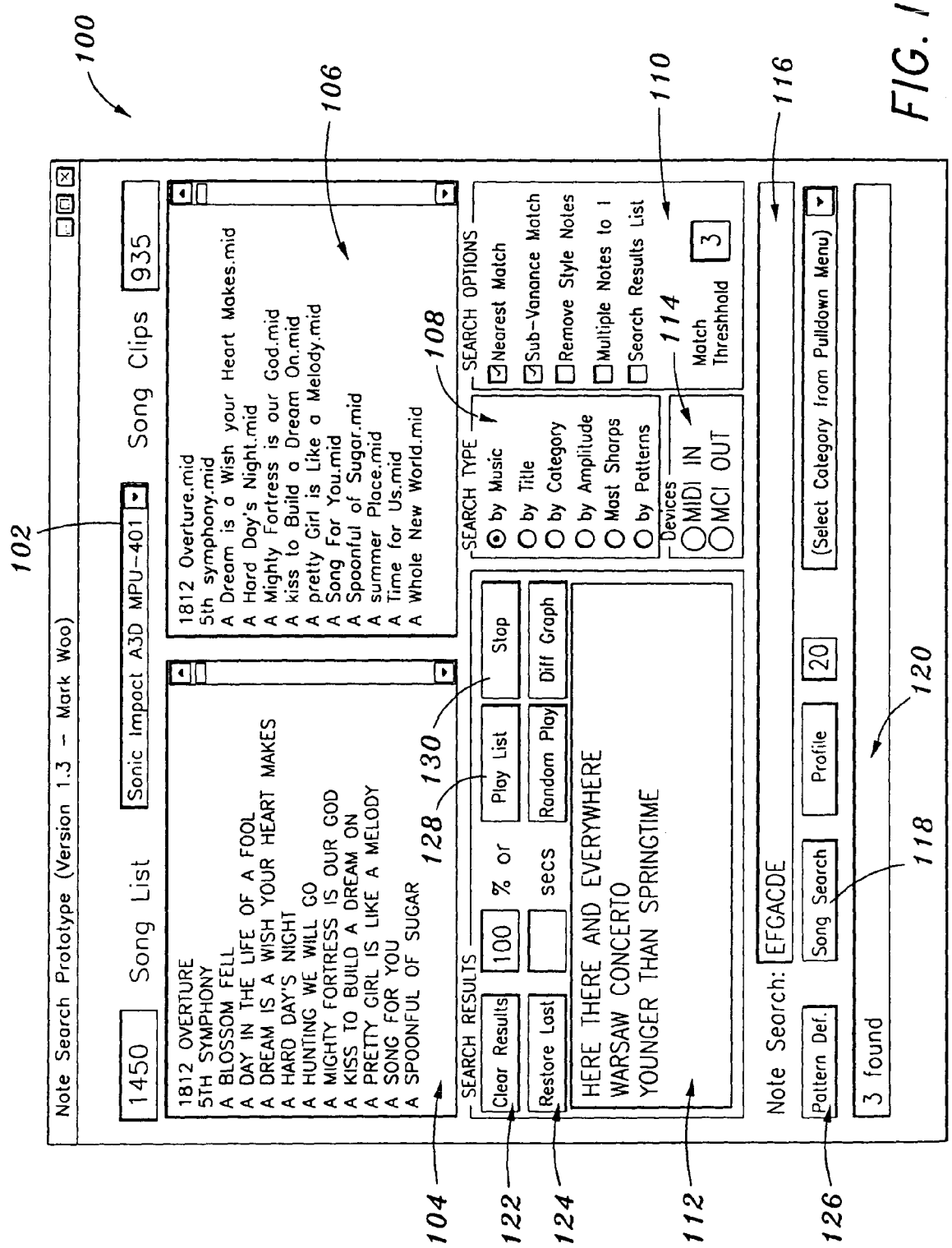
FIG. 1 is a representation of a screen for an application that demonstrates the present invention.

Referring now to the drawings wherein the showings are for purposes of illustrating a preferred embodiment of the present invention only, and not for purposes of limiting the same, FIG. 1 is a screen-shot depicting a typical screen interface 100 for a music search engine constructed in accordance with the present invention. The music search engine is configured to be programmable into a multi-purpose computer, (i.e., Personal Computer) and is operative to find songs from notes entered by the user. Accordingly, a user enters notes into the computer, and the music search engine will determine matches between the notes entered and songs in a song database. As will be recognized to those of ordinary skill in the art, FIG. 1 is representative of only one type of screen interface for the music search engine of the present invention, and that alternative screen presentations are possible.

Referring to FIG. 1, the screen interface 100 is typically presented on a monitor of a computer in order for a user of the music search engine to operate the system. The screen interface 100 includes a MIDI selection box 102 for selecting the MIDI driver to be used with the music search engine. A song list 104 displays all of the encoded songs for the music search engine that can be searched, as will be further explained below. Adjacent to the song list 104 is a song clip list 106 that lists all of the songs that can be played on the computer. As will be recognized, the song clip list 106 contains only songs that the system may play and therefore may be shorter than the song list 104. Below the song clip list 106 is a search type box 108 for determining the type of search that the music search engine should perform. The search type box 108 contains selections for searching the song list 104 by music, amplitude, most sharps and patterns.

Disposed adjacent to the search type box 108 is a search options box 110. If an exact match is not generated, the user of the music search engine has the option of specifying a near search of the song list 104. As seen in FIG. 1, the user can select different searching options from the near search box 110, as will be further explained below. If a song match occurs, the results will be displayed in the search results box 112. The search results box 112 displays a list of all matching songs from the song list 104 based on the notes entered by the user.

The devices box 114 shows the status of the MIDI device that is selected in the MIDI selection box 102. If the device is active, a green light will be displayed next to the corresponding device.

The music search engine is adapted to search the song list 104 using notes entered into the system, as will be further explained below. In this respect, the screen interface 100 includes a search line 116 that displays the note sequence that is used to search the song list 104. Underneath the search line 116 is the song search button 118 that initiates a search of the song list 104. Additionally, a status line 120 displays the number of matching songs from the song list 104.

The music search engine constructed in accordance with the present invention further includes other functions such as a clear results button 122 to clear all search results, a restore last button 124 to restore the last search results, and a pattern def. button 126 that takes the user to a pattern analysis screen. As is evident by screen shot 100, multiple other functions are available to the user such as creating a play list with play list button 128 or stopping playback of music with stop button 130. As will be recognized to those of ordinary skill in the art, the screen interface 100 is programmable to include a multitude of functions for the user, some of which may not be explained by the present application.

BRIEF OVERVIEW OF THE SYSTEM

Figures 2, 2A:
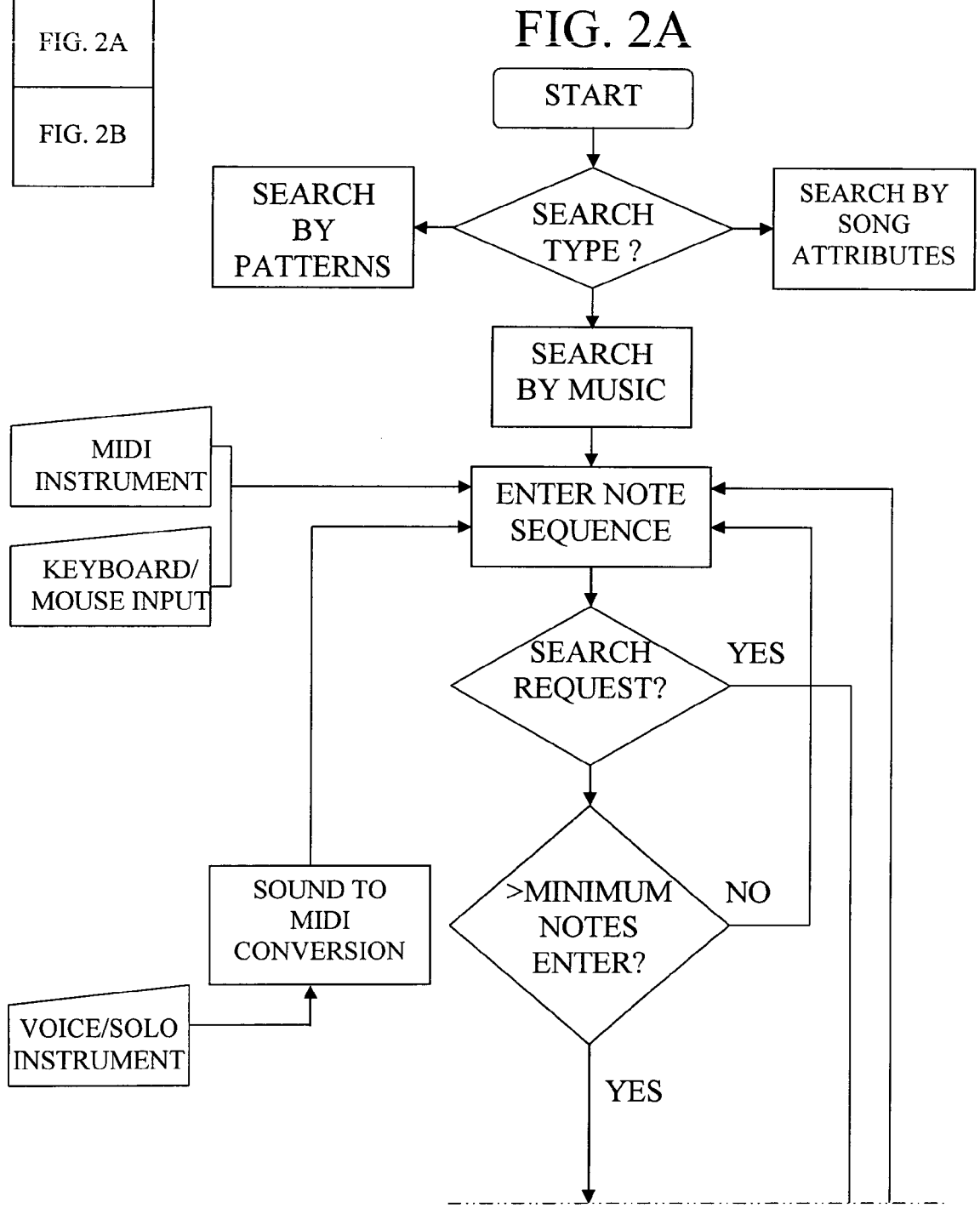
Figure 2B:
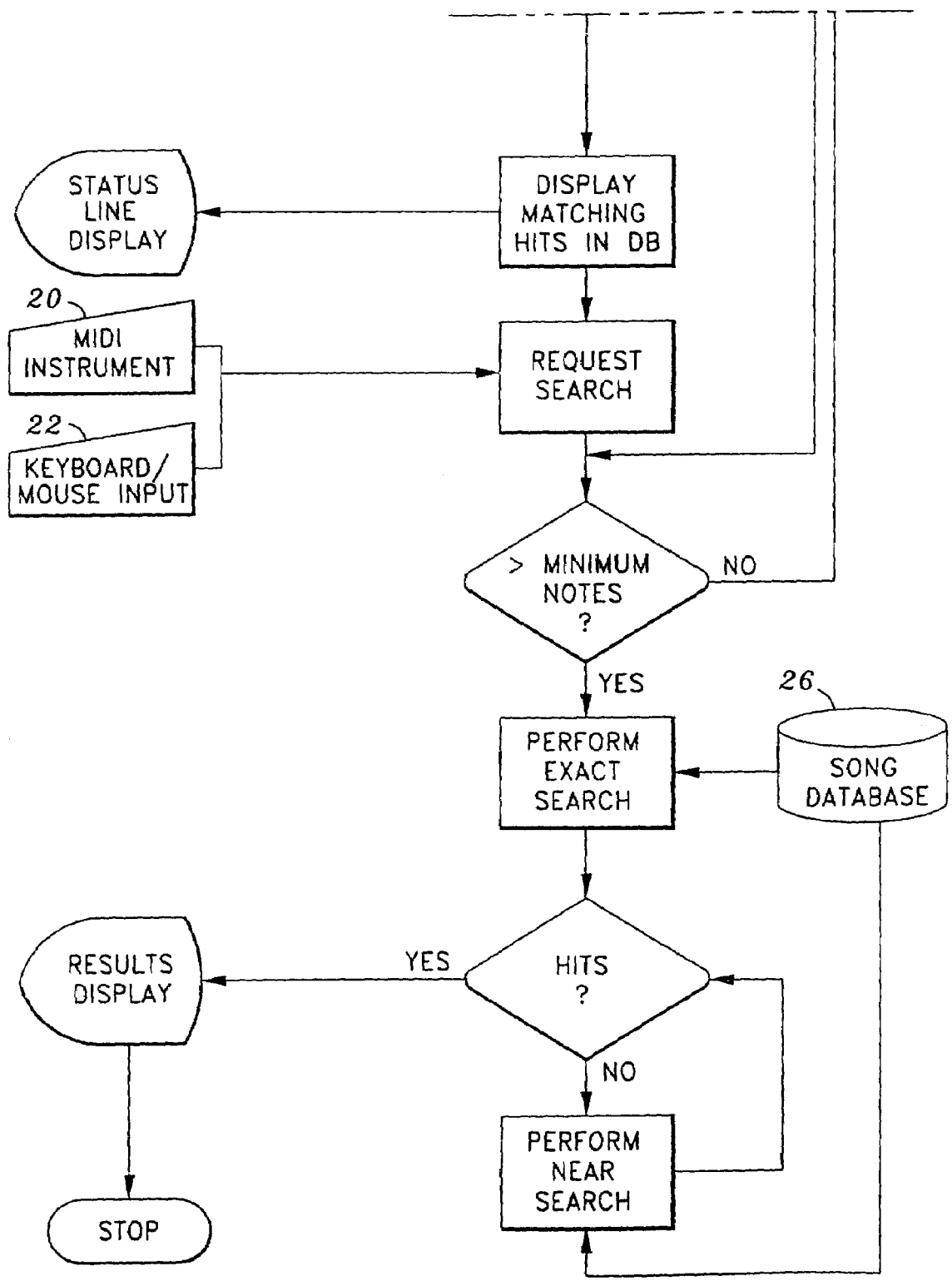

Referring now to FIG. 2, an overview of the operation of the music search engine is shown. The overview shown in FIG. 2 is a flow chart depicting the series of events that the music search engine performs. Certain operations and subroutines of the music search engine will be explained in further detail below.

A search for a song with the music search engine begins by the user first determining the type of search to be performed. The user must determine whether to search for a song by music (i.e., notes), song attributes or song patterns. In the search by music, the user will enter a note sequence into the music search engine. The note sequence may be entered through a MIDI instrument 20, keyboard/mouse input 22 or through a voice/solo instrument 24, all of which may be in electrical communication with the computer that the music search engine is operating from. As seen in FIG. 2, if the note sequence is entered through a voice/solo instrument 24, then the notes must undergo a sound to MIDI conversion.

Once the note sequence has been entered, the music search engine will determine whether the user has requested a search for the notes through the keyboard of the MIDI device. Specifically, the keyboard of the MIDI device may be used to control the operation of the music search engine by having the keys thereof mapped to specific operations of the music search engine. For example, if the highest-note from the MIDI keyboard is depressed, then a search has been requested and the music search engine will drop down to the "> MINIMUM NOTES ?" test. If a search has not been requested through the MIDI device, then the music search engine determines if the note sequence is greater than the required minimum (e.g., 3) notes. If the sequence is not greater than 3 notes, then the music search engine returns to the enter note sequence operation until greater than three notes are entered. If more than three notes are entered, then the music search engine will automatically determine the number of matching songs (i.e. hits) found from a song database 26. The song database 26 comprises songs encoded into a proper format as will be further explained below. The matching songs will be displayed on the status line 120 of the screen interface 100.

The next step of the music search engine is for the user to initiate a search request by using either the MIDI instrument 20 or the keyboard/mouse input 22. If the notes are entered via the voice/solo instrument 24, a pause of a default duration (e.g., 2 seconds) will trigger the search. Once the search has been requested by the user, the music search engine again determines whether a minimum threshold number of notes has been entered. If the minimum number of notes has been entered, then the music search engine will perform an exact search from the songs in the song database 26. The names of any matching songs (i.e., hits) are displayed in the search results box 112 for the user to view and the music search engine is stopped. If there are no matching songs, the music search engine will perform a near search whereby songs that have a relative difference sequence similar enough to the relative difference sequence derived from the note sequence entered by the user (based on the match threshold specified in near search box 110) are considered hits and then displayed.

Note Input Subroutine

Figure 3:
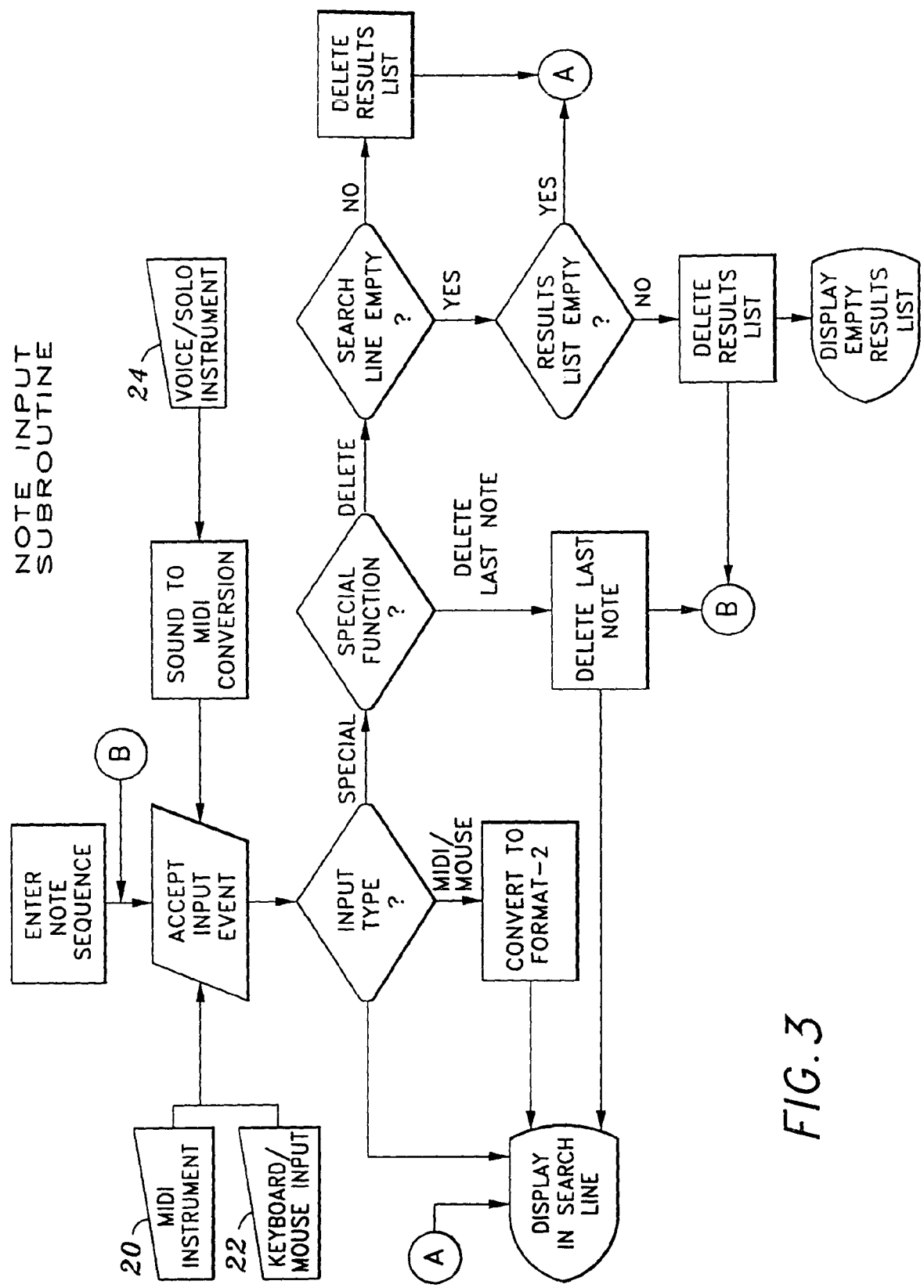

As mentioned above, the user enters the sequence of notes to be searched into the computer through either a keyboard/mouse 22, MIDI instrument 20 or voice/solo instrument 24. In using the keyboard/mouse 22, the user may point and click on a graphical representation of a piano key with the keyboard/mouse 22 in order to choose the desired note. Alternatively, the user may enter the note sequence by inputting the notes directly into the system with the keyboard. The user enters a note sequence with the voice/solo instrument 24 by singing or humming notes, which are converted into a MIDI format, as will be further explained below. Referring to FIG. 3, the note input subroutine begins by accepting an input event from the MIDI instrument 20 or the keyboard/mouse input 22. Alternatively, the voice/solo instrument 24 may generate an input event that is converted to a MIDI format. Typically, the input event is a single note of the note sequence to be searched. The note input subroutine determines if the input is a note or an operation to be performed by the music search engine. For example, if the MIDI instrument is a keyboard, the highest note may be programmed to initiate searching operations. On the other hand, the lowest notes of the MIDI keyboard may be programmed to delete the search buffer or the last note entered into the string. It will be recognized by those of ordinary skill in the art that the keyboard of the MIDI instrument may control other functions of the music search engine, as desired.

If the note input subroutine determines that the input is a musical note, the note will be converted to Format-2, as will be explained in further detail below. Once the notes are converted to Format-2, the notes are displayed on a search line 116, as shown in FIG. 1. Accordingly, the note input subroutine creates an input string of note differences that will be compared to the songs in the song database 26, as will be further explained below.

However, if the input is an operation of the music search engine, the music search engine will determine the type of operation that should be performed. For example, if the input note subroutine determines that the input is a "delete last note" input, then the last note entered into the computer will be deleted. However, if the function is "delete", then the music search engine will determine whether the search line 116 of the music search engine is empty and if not then delete the line. If a search results box 112 of the music search engine is not empty, then the music search engine will delete the same also. Once the search line 116 and the search results box 112 are empty, the music search engine will accept other notes by returning to point "B" in the input notes subroutine.

Convert Notes to Format-2 Subroutine

Figures 4, 5:
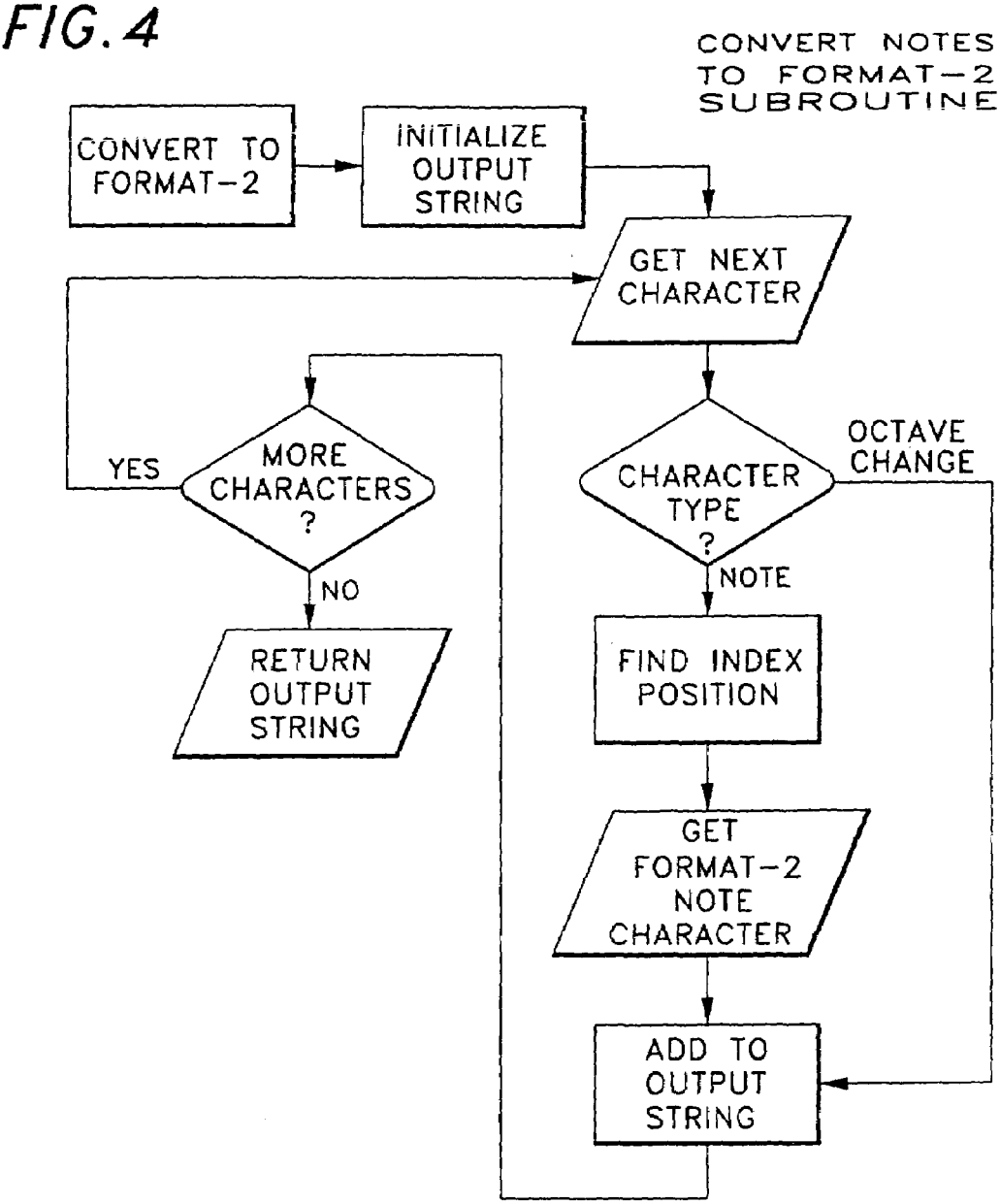

As previously mentioned above, after the notes are inputted, they are converted to Format-2 and displayed in the search line 18. Format-2 represents each note in the input sequence in a commonly recognizable note representation. The music search engine creates an output string of musical notes that can be displayed on the search line 116. Referring to FIG. 4, the convert notes to format-2 subroutine (i.e., Format-2 subroutine) begins by initializing an output string. Next, a character from the input device (i.e., keyboard/mouse 22, MIDI instrument 20, or voice/solo instrument 24) is retrieved. The Format-2 subroutine determines whether the character retrieved is a note or octave change for the note. In some instances, the octave for a note inputted may be higher or lower than the octave for the preceding note. As such, if the octave has increased, the Format-2 subroutine will add a ">" symbol preceding the note that is an octave higher into the output string. Conversely, if the octave decreases, the music search engine will insert a "<" symbol preceding the note that is an octave lower. Once the Format-2 subroutine has determined if the note inputted is an octave higher or lower, the Format-2 subroutine will find the index position of the note and retrieve the Format-2 note character(s) from memory.

Specifically, as seen in FIG. 5, each musical note has a scale value (corresponding to a Format-1 character) and a Format-2 character(s). The Format-1 character corresponds to the top row of keys on a computer keyboard, such that entry of notes may be easily accomplished with the keyboard and each note is represented by a single character. A Format-2 note may be represented by one or two characters. Sharps and flats are represented as 2-character sharps. Accordingly, a note of "C" will have Format-2 character of "C", a SCALE value of 01, and a Format-1 character of "1". On the other hand, a note of "D#" (identical to "E-flat") will have a Format-2 representation of "D#", a SCALE value of 04, and a Format-1 character of "@". Once the Format-2 character(s) of each note is found, the Format-2 subroutine repeats the process until a string of Format-2 characters representative of the input string is created. The output string of Format-2 characters is displayed at the search line 116.

Display Matching Hits Subroutine

Figure 7:
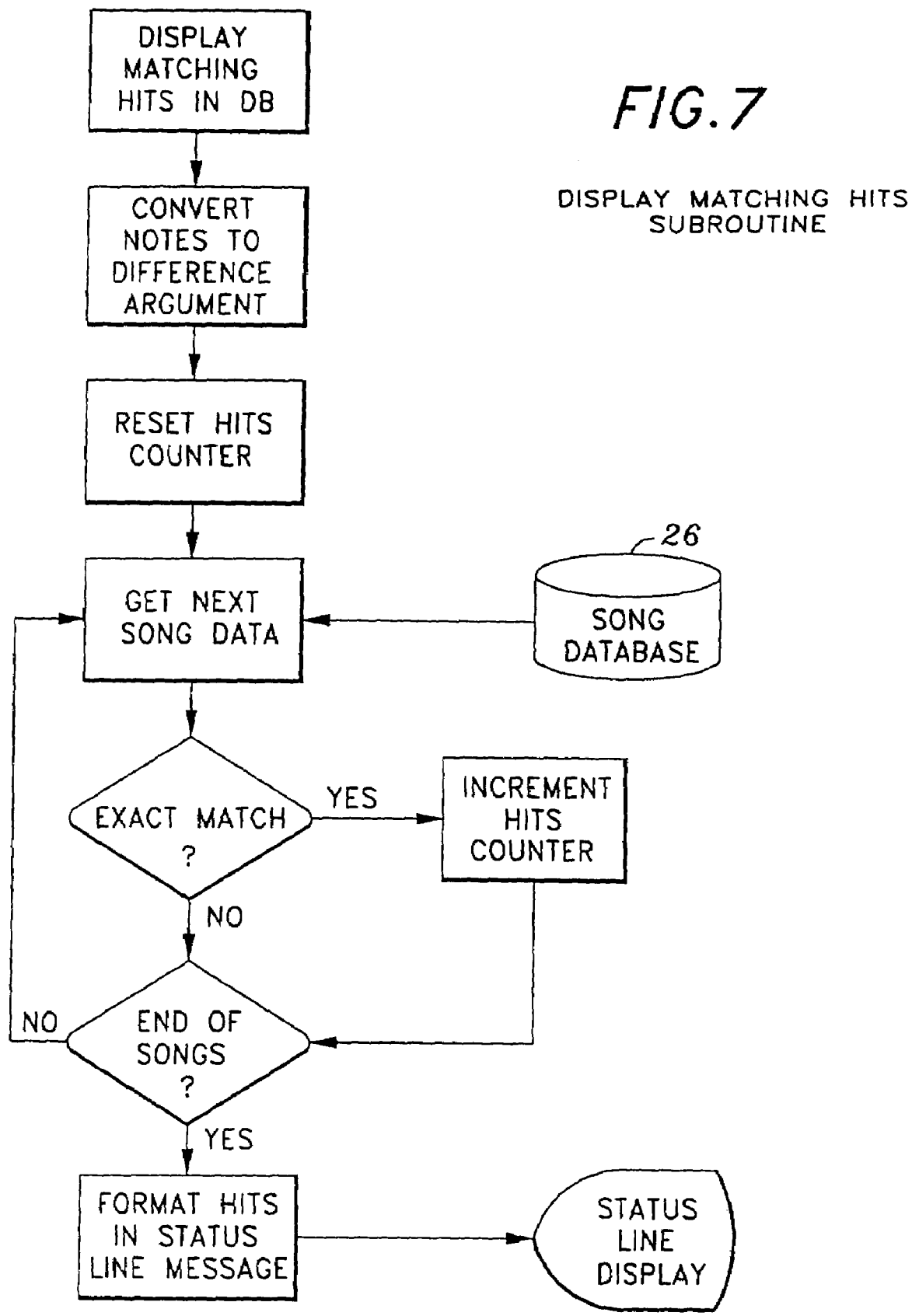

Referring to FIG. 7, the display matching hits subroutine determines whether the input note sequence corresponds to any notes of the songs in a song database 26. As previously mentioned, the 'display matching hits' is performed after more than the required minimum number of notes have been entered. The first step in the display matching hits subroutine is to convert the notes to a difference argument. The difference argument allows the music search engine to efficiently search for songs independent of key, and will be explained in further detail below. Once the input note sequence has been converted to a difference argument, a hits counter is reset in the display matching hits subroutine. The hits counter records the number of matches found between the input note sequence and the song database 26. The difference argument of the input note sequence is next compared to the encoded songs in the song database 26. Each song in the song database 26 is encoded into a difference character string (i.e., difference sequence) in a manner explained below. The difference argument is compared to the difference sequence of the songs in the song database 26 for an exact match. Specifically, the difference argument generated by the 'convert notes to difference argument' is compared to each difference sequence for the songs in the song database 26. If the difference argument of the inputted note sequence exactly matches a portion of a difference sequence for a song in the song database 26, then the hits counter is incremented by one to signify the match. After each of the difference sequences for each of the songs in the song database 26 has been compared to the difference argument generated by the convert notes to difference argument subroutine, the display matching hits subroutine displays the number of matches in the hits list 120, as seen in FIG. 1. The net result is that, for every note entered (after the first two notes), a 'running hits count' is instantaneously displayed in the status line 120 without a full search operation (which would return the matching songs in the results list).

Convert Notes to Difference Argument Subroutine

Figure 8:
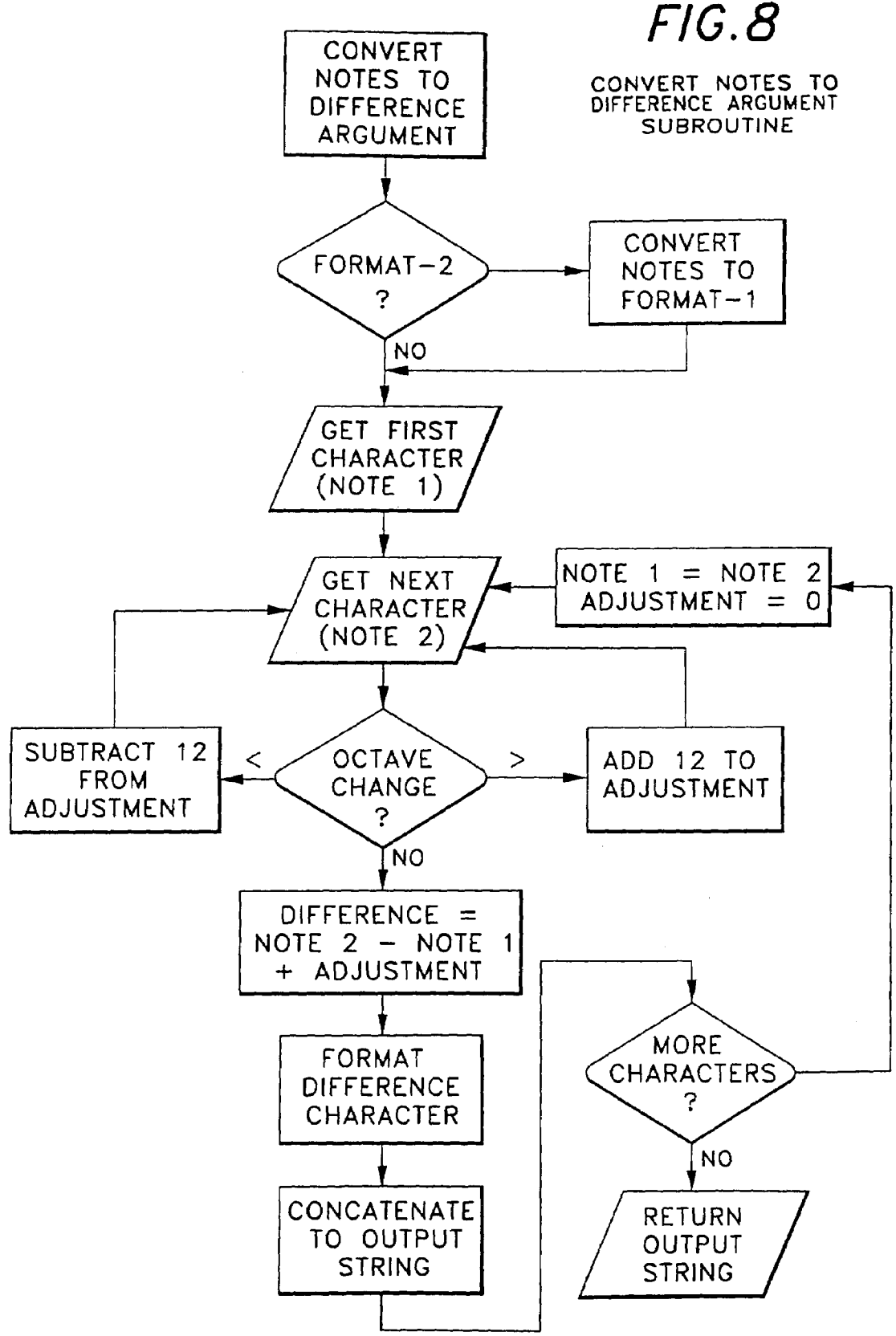
Figure 9:
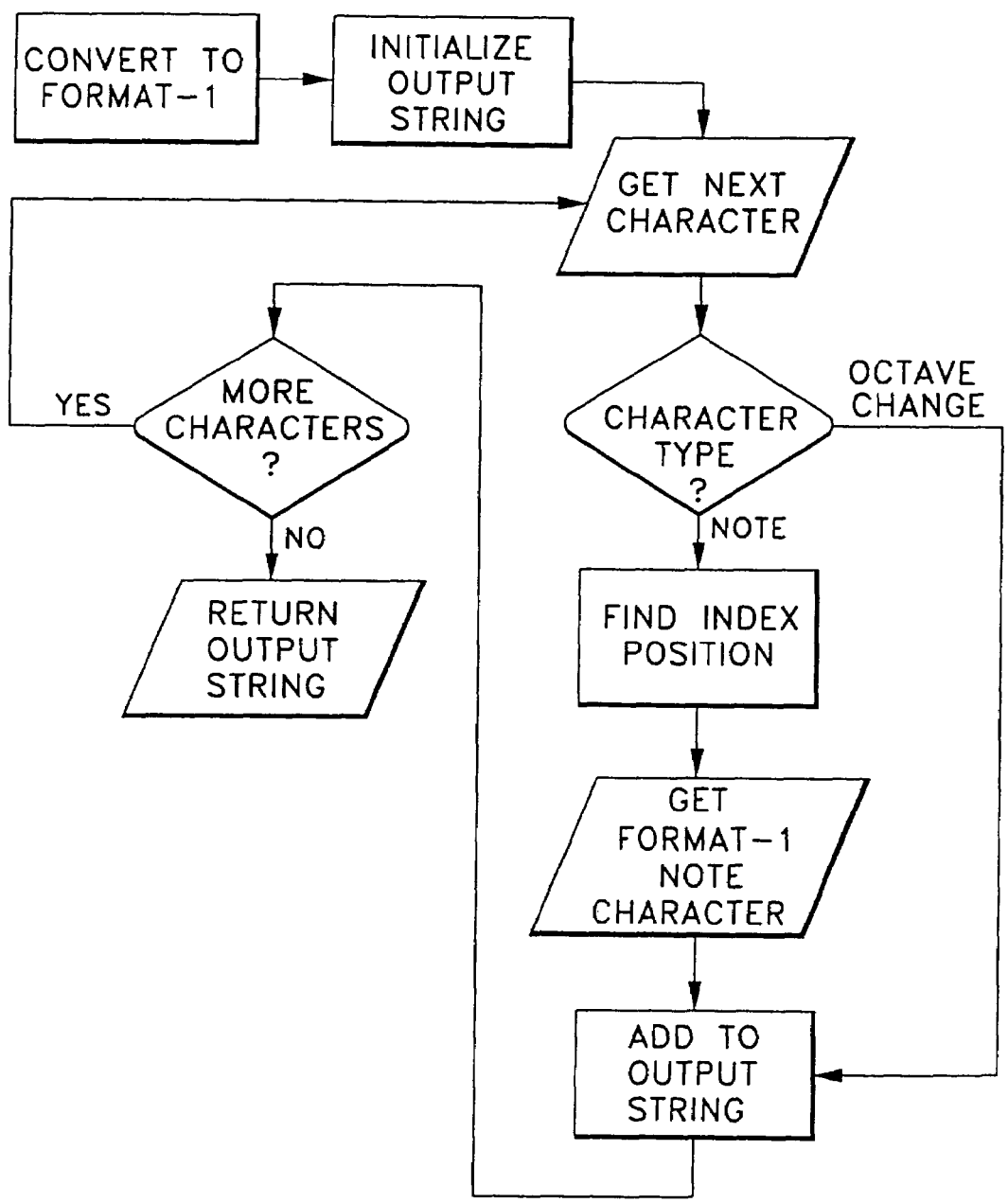

Referring to FIG. 8, the convert notes to difference argument subroutine begins by determining the format of the inputted notes. If the notes are in Format-2, the notes must be converted to Format-1 first. Specifically, the convert notes to Format-1 subroutine shown in FIG. 9 prepares a Format-1 output string by retrieving the next input note, finding its index position, determining the Format-1 character for the note, and adding the Format-1 character to an output string. This iterates until all notes have been converted. As with the Format-2 conversion, the Format-1 output string will signify a change in octave with a ">" for an octave up and a "<" for an octave down.

Once the input notes have been converted into a Format-1 string, the 'convert notes to difference argument' subroutine retrieves the first note (i.e., note 1). The next note (i.e., note 2) is then retrieved. As seen in FIG. 8, the convert notes to difference argument subroutine determines whether note 2 is a change octave character (i.e., "<" or ">"). If the second character in the input string is not an octave change character, the convert notes subroutine determines a difference value between the first and second notes. Specifically, the difference is calculated by subtracting the index value of the first note from the index value of the second note (i.e., note 2–note 1). An adjustment to compensate for an octave change (when applicable) is added to the difference between note 2 and note 1, as will be further explained below.

In the preferred embodiment of the present invention, the difference value will typically be the difference in the corresponding SCALE value between adjacent notes in the input sequence. For example, if note 1 is D and note 2 is F#, the difference value between the notes D (SCALE=03) and F# (SCALE=07) will be equal to 04 (i.e., note 2–note 1=07–03=04). Once the difference value is calculated, the difference value is converted to a difference character. In the preferred embodiment of the present invention, the difference character is determined by adding the difference value to ASCII (127). For the example shown above, the difference character for the notes F# and D will be ASCII (131) (i.e., 127+4). Once the difference character between adjacent notes is determined, the difference character is concatenated to the difference argument, as seen in FIG. 8.

If there are additional notes in the Format-1 string, the difference character must be determined between the current note and the next note, and added to the difference argument. Accordingly, the convert notes to difference argument subroutine will reset such that the second note previously retrieved will become the first note and the next note retrieved from the Format-1 string will become the second note. Additionally, any adjustment made for a change in octave will be reset. The convert notes to difference argument subroutine will then determine the difference value between those two notes and concatenate the corresponding difference character to the difference argument.

As is evident from the foregoing, the difference character is not dependent upon the key of the music or the value of the notes in the music, but between the value of the difference between succeeding notes of music. As mentioned above, if a succeeding note is either an octave higher or lower than a preceding note, it will be preceded by either "<" or ">". The convert notes to difference argument subroutine determines whether a character in the Format-1 output string is "<" or ">" in order to determine whether an octave change between notes has occurred. The convert notes to difference argument subroutine includes an adjustment counter that indicates whether the note is an octave higher or lower than the preceding note. For example, if the character in the output string is "<", then a value of 12 is subtracted from the adjustment counter thereby signifying that the note is an octave lower than the preceding note. Similarly, if the character in the output string is a ">", then 12 is added to the adjustment counter. Once the octave change character has been determined, and the adjustment counter incrementally changed accordingly, the convert notes subroutine will retrieve the note in the Format-1 input string that is referenced by the octave change character. The value of the adjustment counter is added to the difference value in order to calculate the difference character. For example, if note 1 is D and note 2 is F#, but preceded by the change octave character "<" (i.e., one octave lower), then the adjustment for note 2 is −12. Accordingly, the difference value would be 07−03+(−12)=−8. The difference character would be (127)+(−8)=(119). The convert notes to difference argument subroutine therefore produces a difference argument corresponding to the relative differences in values between the musical notes entered into the music search engine. As will be evident, the difference argument will contain one less character than the number of notes entered into the music search engine.

It will be recognized that the songs in the song database 26 will be encoded into respective difference character strings (i.e., difference sequences) by the above-described method. Accordingly, both the inputted notes and the songs in the song database 26 will be in the same format for comparison.

Exact Search Subroutine

Figure 6:
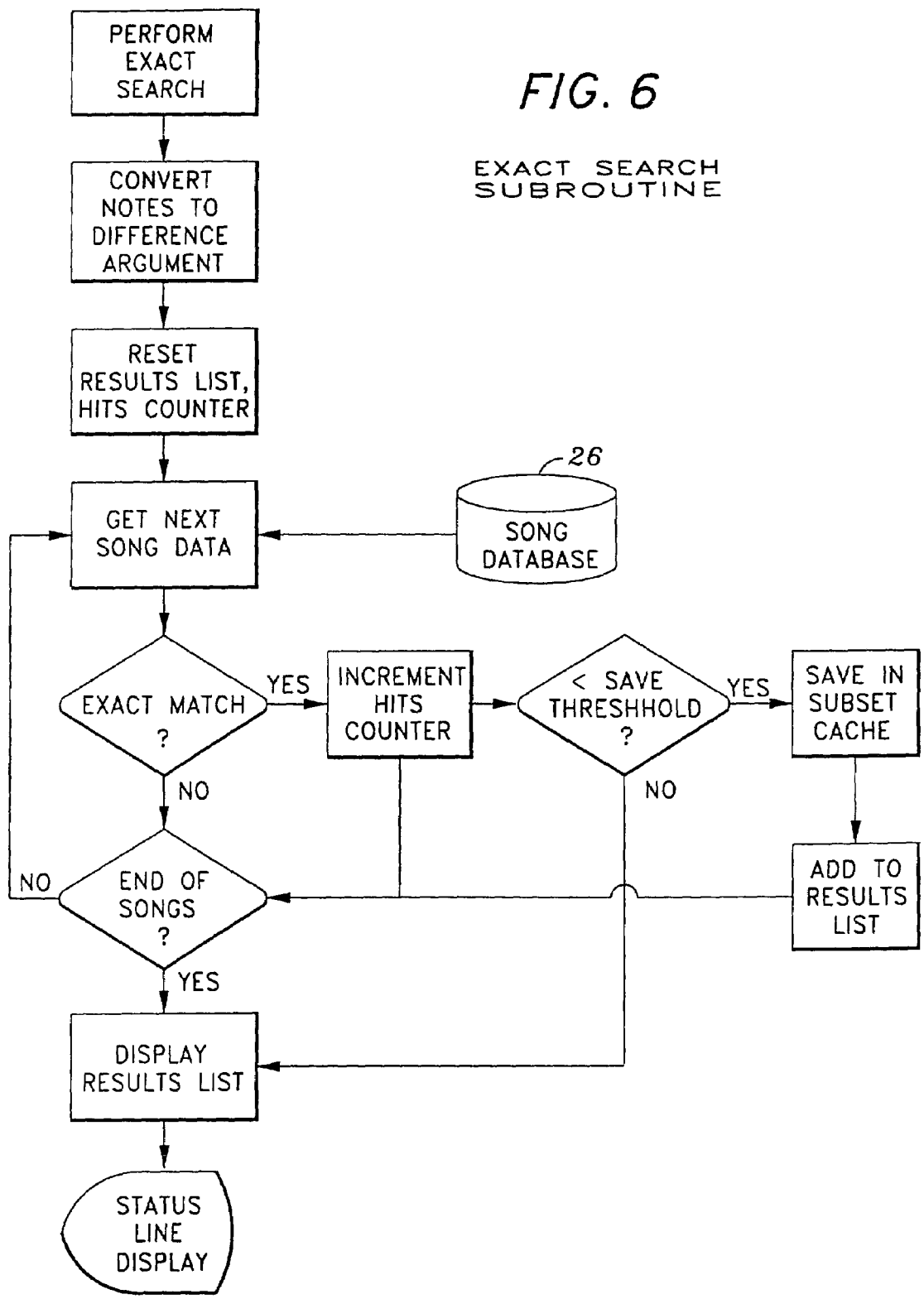

As mentioned above, if the user requests a search and the minimum number of notes requirement is met, then the song search process will proceed to the exact search subroutine. Referring to FIG. 6, the exact search subroutine begins by converting the notes to a difference argument as described above and shown in FIG. 8. Once the input notes are converted to the difference argument string, a result list and the hits counter are reset to zero such that information about new matches can be recorded. Once the above-mentioned counters have been reset, the input note sequence converted to the difference argument is compared to the difference sequence for the encoded songs stored in the song database 26, as discussed above. Specifically, the difference argument of the input note sequence is compared to the difference sequence for each of the songs stored in the song database 26. If the input difference argument exactly matches a portion of the difference sequence of a specific song in the song database 26, then the exact search subroutine increments the hits counter to indicate an exact match. Next, if the number of hits is below a threshold level (optionally set by the user), the title of the matching song is saved and added to the search results box 112. The process continues until all difference sequences for the songs in the song database 26 have been compared to the difference argument of the input note sequence. If the number of hits is greater than the maximum level set by the user, the comparison process stops and the titles of the songs (i.e., the results list) found up to this point are displayed in the search results box 112.

Near Search Process

Figure 10B:
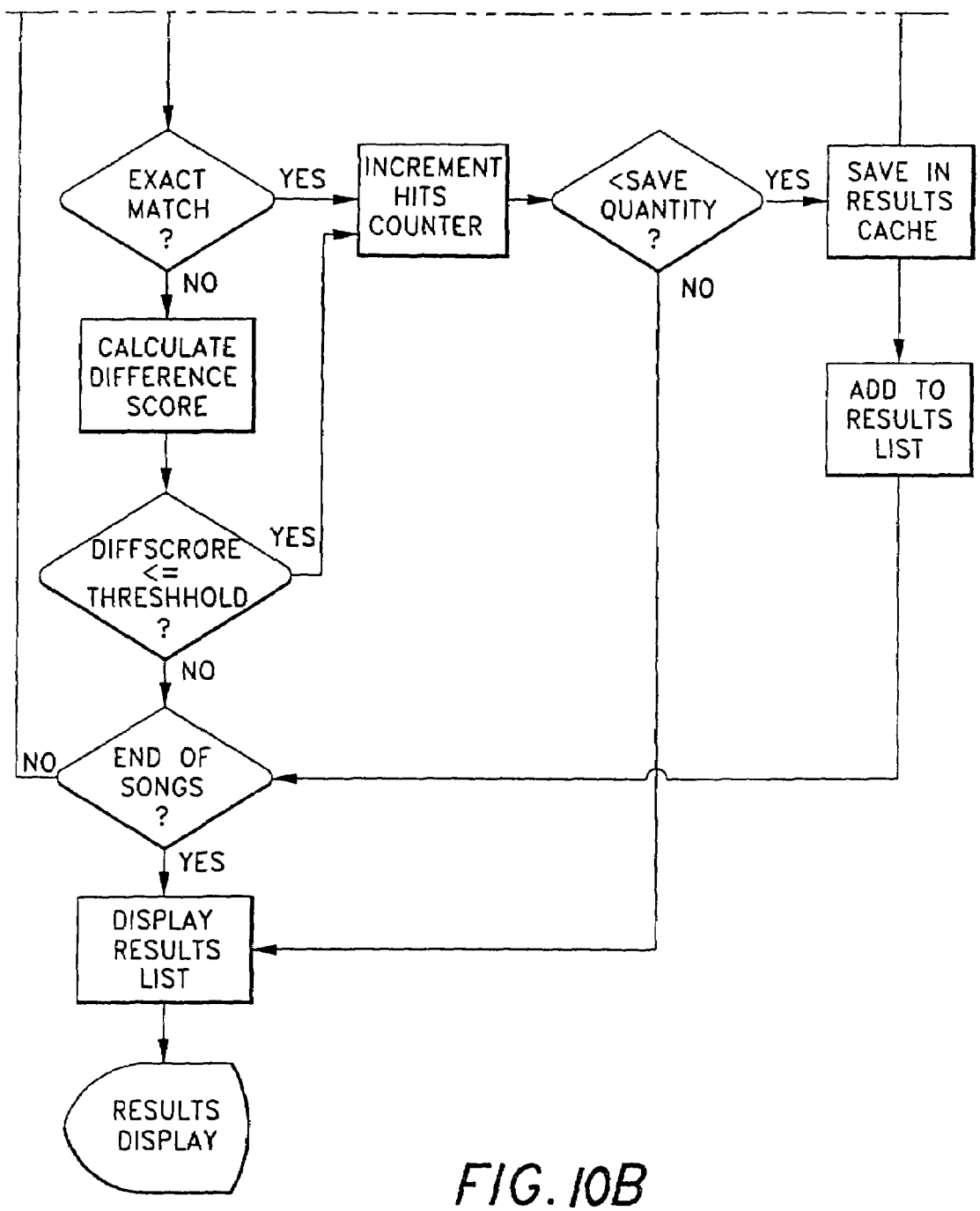

As previously mentioned, if there are no hits after the exact search has been conducted, then the music search engine will perform a near search. Referring to FIG. 10, the near search subroutine allows a user to find songs that are similar to the inputted note sequence. Specifically, the user can determine what type of music will match the relative difference sequence of the inputted notes based on how much variance will be considered a matching song between the inputted notes and the songs in the song database 26. Referring to FIG. 10, the near search subroutine begins by resetting a lowest score and a subvariance counter. After the counters are reset, the near search subroutine determines whether the user wants to sort the songs through some type of filtering option. The filtering options allow the user to determine what types of preprocessing will be applied before starting the search. If one or more filtering options is selected by the user, the near search subroutine will perform the filtering operations before starting the search.

Next, the near search subroutine determines if the user wants to perform a subset search of songs already found as matches. In the preferred embodiment of the present invention, the user can specify if a list of songs from the results box 112 should be searched as a subset. If the user wishes to search the subset, then any matching songs saved in a results cache 30 will be used instead of the song database, as seen in FIG. 10 at point "A".

If a subset search is not to be performed, the near search subroutine then retrieves the difference sequences from the song database 26. If filtering operations were selected by the user, each difference sequence from the song database 26 is filtered. Next, the difference argument of the input note sequence and the difference sequence from the song database 26 are compared for matches. If an exact match occurs, then the hits counter is incremented and the results will be saved in the results cache 30 if the number of hits saved is below a prescribed maximum quantity.

If an exact match doesn't occur, then the near search process subroutine proceeds to calculate a difference score and compare such to the threshold value. If the difference score is less than or equal to the prescribed threshold (i.e., within the allowable variance), then a near match has occurred. The threshold value may be specified by the user or calculated by the search engine (based on the number of notes entered) to determine the allowable number of notes in variance to still be considered a near match. If a near match is determined, then the title is added to the results list, and the results saved in the results cache 30. The near search subroutine continues processing until all of the songs in the song database 26 or the subset (if applicable) have been compared to the input note sequence. Once the comparisons have been made, the results are displayed in the search results box 112.

Calculate Difference Score Subroutine

As seen in FIG. 11, the calculate difference score subroutine proceeds by initializing a MinScore and a SaveHits register. Next the encoded song data from the song database 26 is retrieved. At this point, the input note sequence and the encoded song data (both in difference string format) are converted to numeric integer arrays for faster computation. Accordingly, the difference score subroutine calculates an absolute difference between characters of the input notes and the notes for the current song from the song database 26. If the absolute difference between the input array and the difference array of the database song at the current position is less than the current MinScore, then the calculate difference score subroutine will save the value as the MinScore and move to the next compare position. After comparisons have been made at all starting positions of the song array, the MinScore for the current song is returned to the near search subroutine.

Perform Filter Options Subroutine

Figure 12:
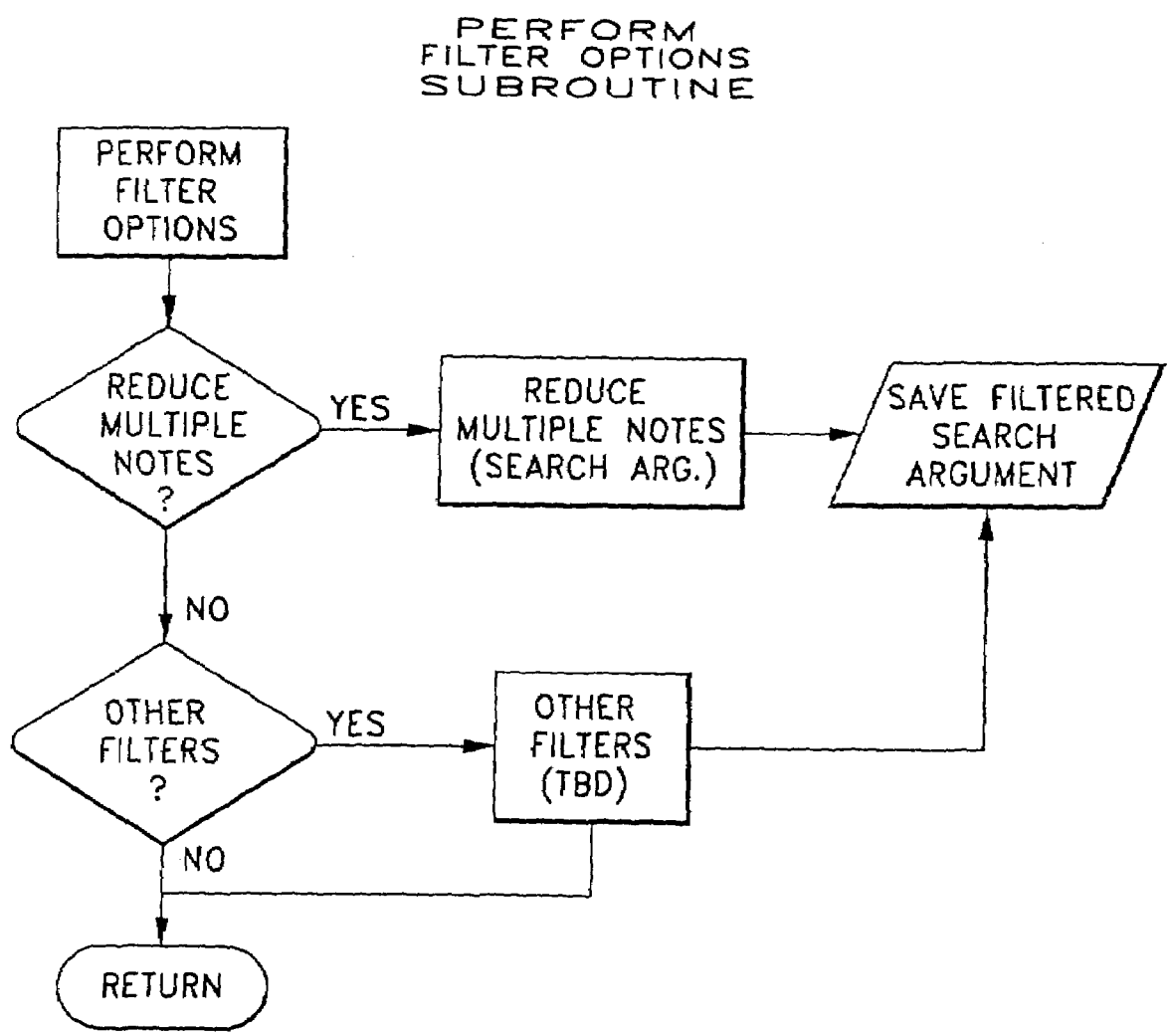

As mentioned above, the near search subroutine can perform filtering options on the input note sequence and the songs from the song database 26. Such filtering includes reducing identical adjacent characters of the input note sequence and identical characters in the songs from the song database 26 into a single character in order to improve search results. Specifically, the option for reducing multiple notes into a single note is shown in FIG. 12. The input difference argument (i.e., string of difference characters for the input notes) may be reduced by removing difference characters that represent duplications of an adjacent note, as will be further explained below. Once the input difference argument has been reduced, it will be saved. At that time other filter options may be applied to the difference input argument. All applicable filtering options will be stored for subsequent use in the filtering of song data.

Reduce Multiple Notes Subroutine

Figure 13:
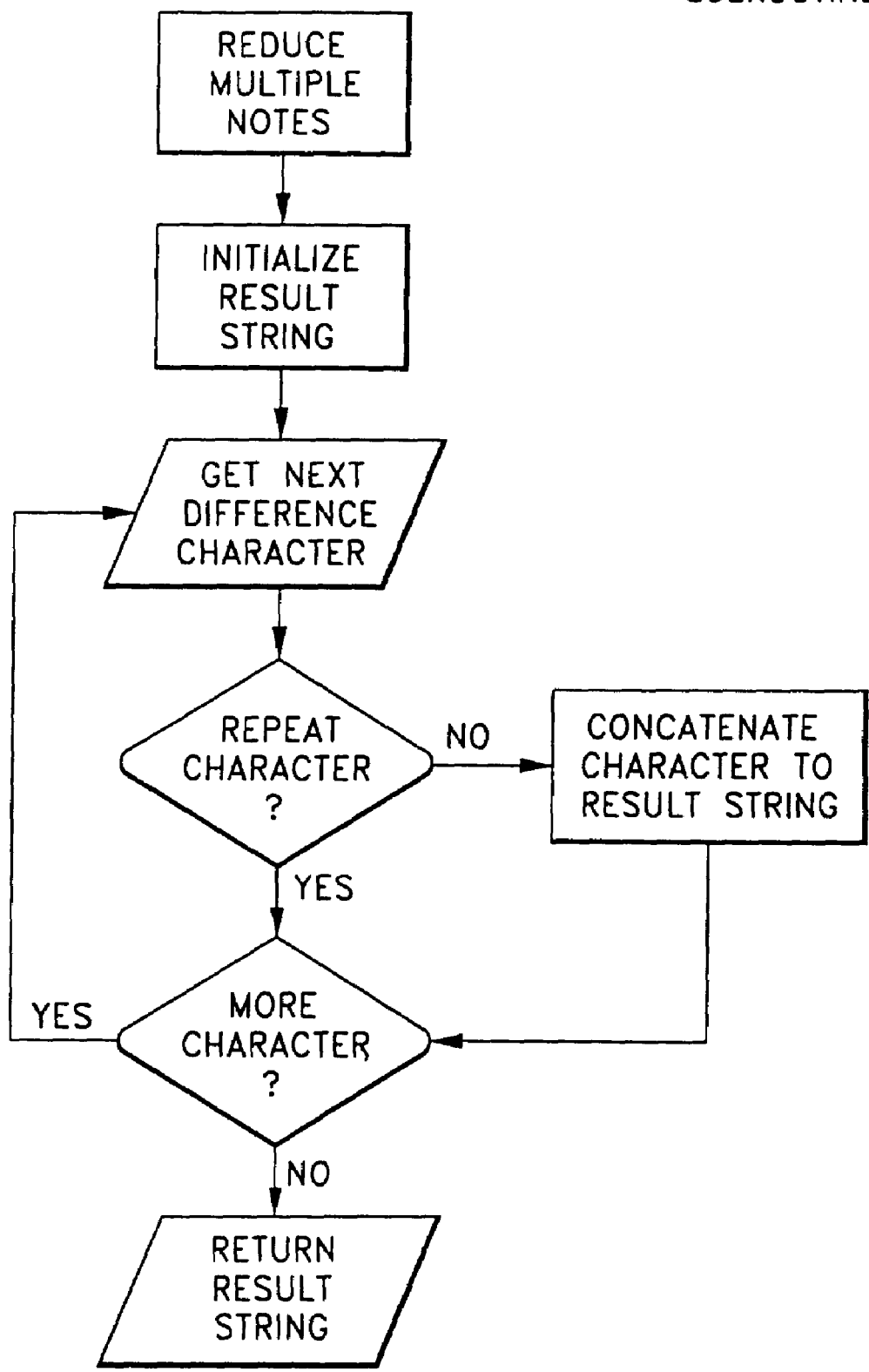

As seen in FIG. 13, the multiple notes are reduced by first initializing a results string and then retrieving the next difference character of the difference argument string. The character is compared with an adjacent character to determine if it is a repeat character (ASCII value 127, representing no change between adjacent notes). A non-repeat character is concatenated to the results string, while a repeat character is dropped. The reduce multiple notes subroutine proceeds to retrieve the next character in the string to perform the same iterative processing until no more characters are left, at which point the results string is returned.

Filter Song Data Subroutine

Figure 14:
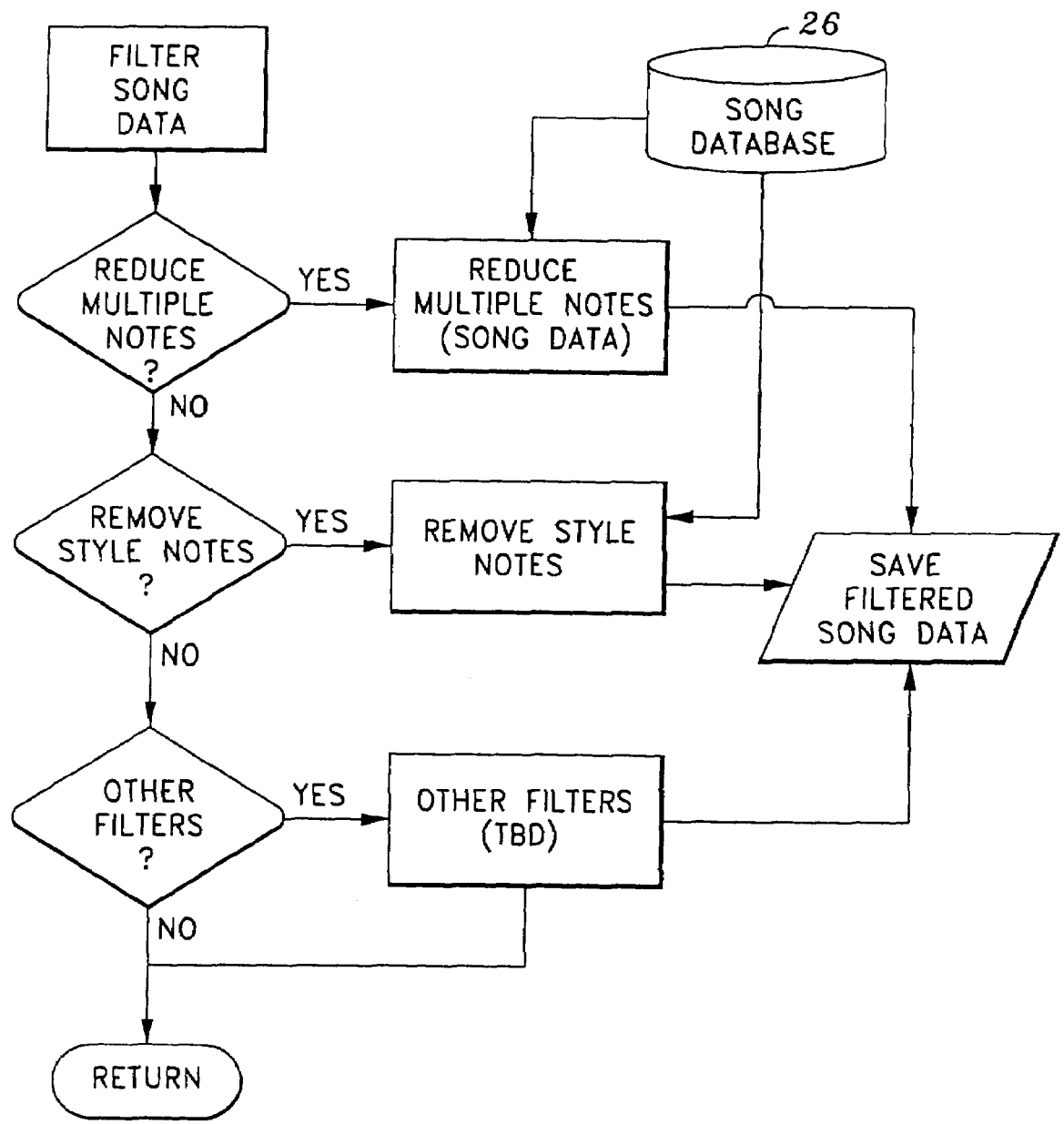

In order to determine whether the filtered input note sequence matches any songs from the song database 26, the songs from the song database 20 will need to be filtered in a similar manner. As seen in FIG. 14, the song data is filtered in a similar manner as the input notes are filtered. Specifically, multiple notes of the song from the song database 26 are reduced (i.e., difference repeat characters are removed) using the reduce multiple notes subroutine previously described. Next, stylistic notes in the songs of the song database 26 can be removed and other filtering options can be performed as desired. Such artistic notes can be recognized as one or more short notes (typically off-beat) before or after a baseline note (typically longer and on-beat). Accordingly, such notes can be recognized, filtered and removed with the addition of quantized timing (rhythm) information described below. Once the song from the song database 26 has been filtered, the result will be returned to the near search subroutine for comparison to the filtered input note sequence.

Pattern Search Subroutine

Figure 15:
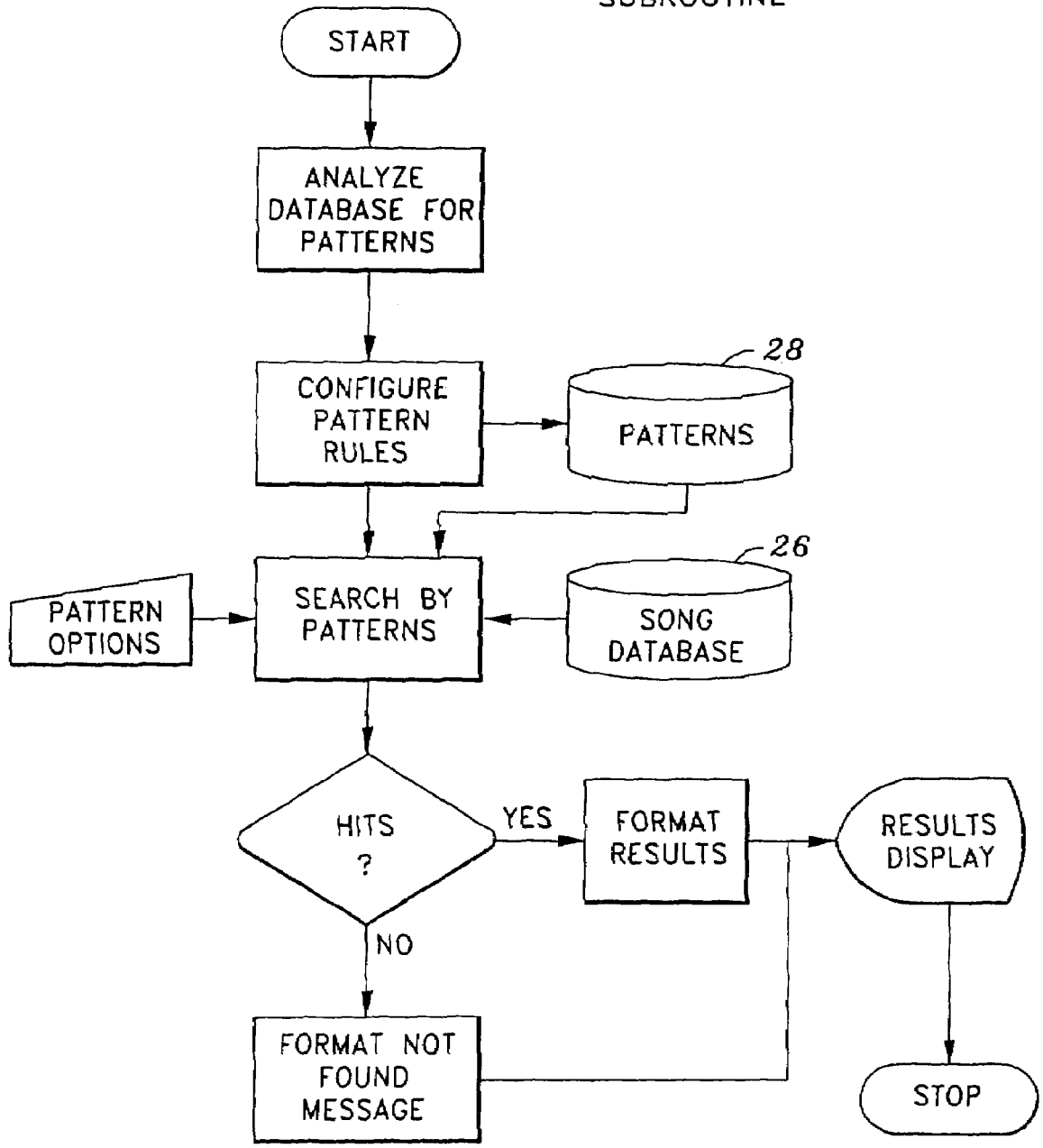

The music search engine may also be used for music pattern analysis. Specifically, by encoding the songs from the song database 26 and the input note sequence into difference character strings, patterns within music can be more easily identified and analyzed. Referring to FIG. 15, the first step in the pattern search subroutine is to analyze the song database 26 for desired patterns. Once the song database 26 has been analyzed, the pattern search subroutine will configure pattern rules and store such patterns matching those rules within a pattern database 28. The pattern search subroutine will next search for patterns selected by the user in the song database 26. The pattern search subroutine will look for patterns and determine whether they are present in the songs within the song database 26. If the patterns are present, then the matching song title(s) will be displayed in the search results box 116. If no matches are present, then the status line will display a "Not Found" message. It will be recognized that multiple patterns may be searched for in each song such that songs with all of the desired patterns will be found. By converting the notes of the songs in the song database 26 into the difference argument string, the songs can be analyzed according to the differences between the notes and such patterns may become recognizable.

Analyze Database Subroutine

Figure 16:
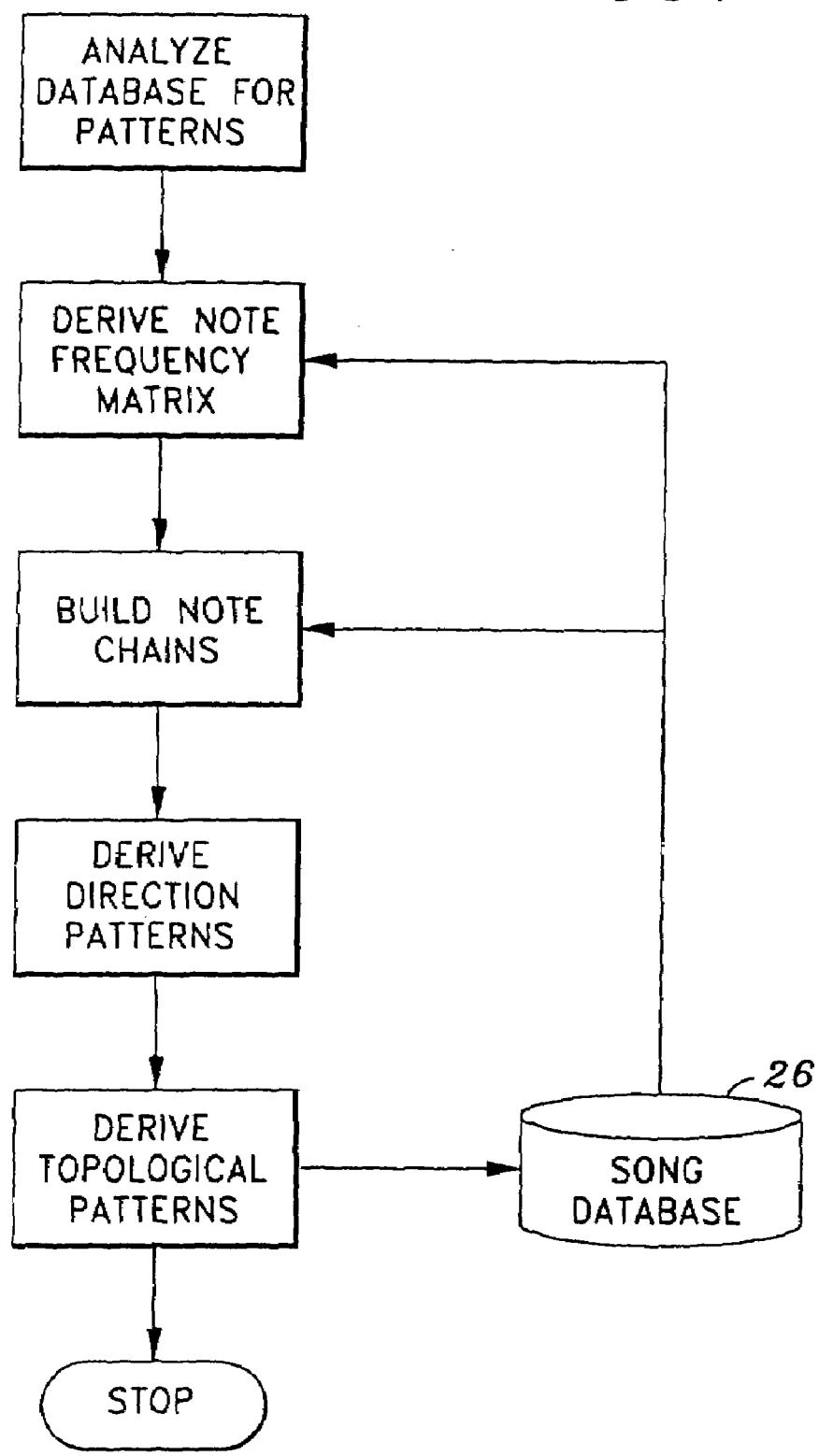

As mentioned above, the song database 26 may be analyzed to derive commonly occurring patterns. Referring to FIG. 16, the analyze database subroutine begins by deriving a frequency matrix of the difference characters for the songs in the song database 26. The frequency matrix is a listing of how many times a specific difference character is found adjacent to other difference characters in the songs contained within the song database 26. From the frequency matrix, iteratively longer difference character chains can be built. The chains are built based on linking the most frequently occurring combination of difference characters with additional difference characters. Next, direction patterns can be derived that indicate how adjacent difference characters in a chain increase, decrease, or remain the same. Finally, topological patterns can be derived that graphically show the differences between gross directional change trends in the songs contained within the song database 26. Specifically, the demographics of the music determined from the direction patterns, difference character chains, and frequency matrix can be represented into topological (i.e., graphical) patterns via simplification and trending, similar to recognition of patterns and trends in a graph by 'zooming out'. The topological patterns are stored in the song database 20 such that they may be compared and/or searched.

Voice Input Application

As mentioned above, the music search engine is typically used with a MIDI instrument 20 or a keyboard/mouse input 22 to enter notes that are to be searched. Alternatively, the voice/solo instrument 24 may be used to enter notes if the user is not familiar with keyboard instruments. Specifically, the user will sing into a microphone or other similar device connected to an electronic processor. The processor will contain software that is able to recognize the user's voice and convert it into musical notes. The voice is converted into musical notes in a MIDI format. Currently, software for personal computers can convert the voice input of a singer or audio input of a solo musical instrument into a string of musical notes in MIDI format. Accordingly, a user can sing or hum the melody of the song that he or she wishes to find, and it will be converted into musical notes that can be searched by the music search engine.

Karaoke Application Subroutine

Figure 17:
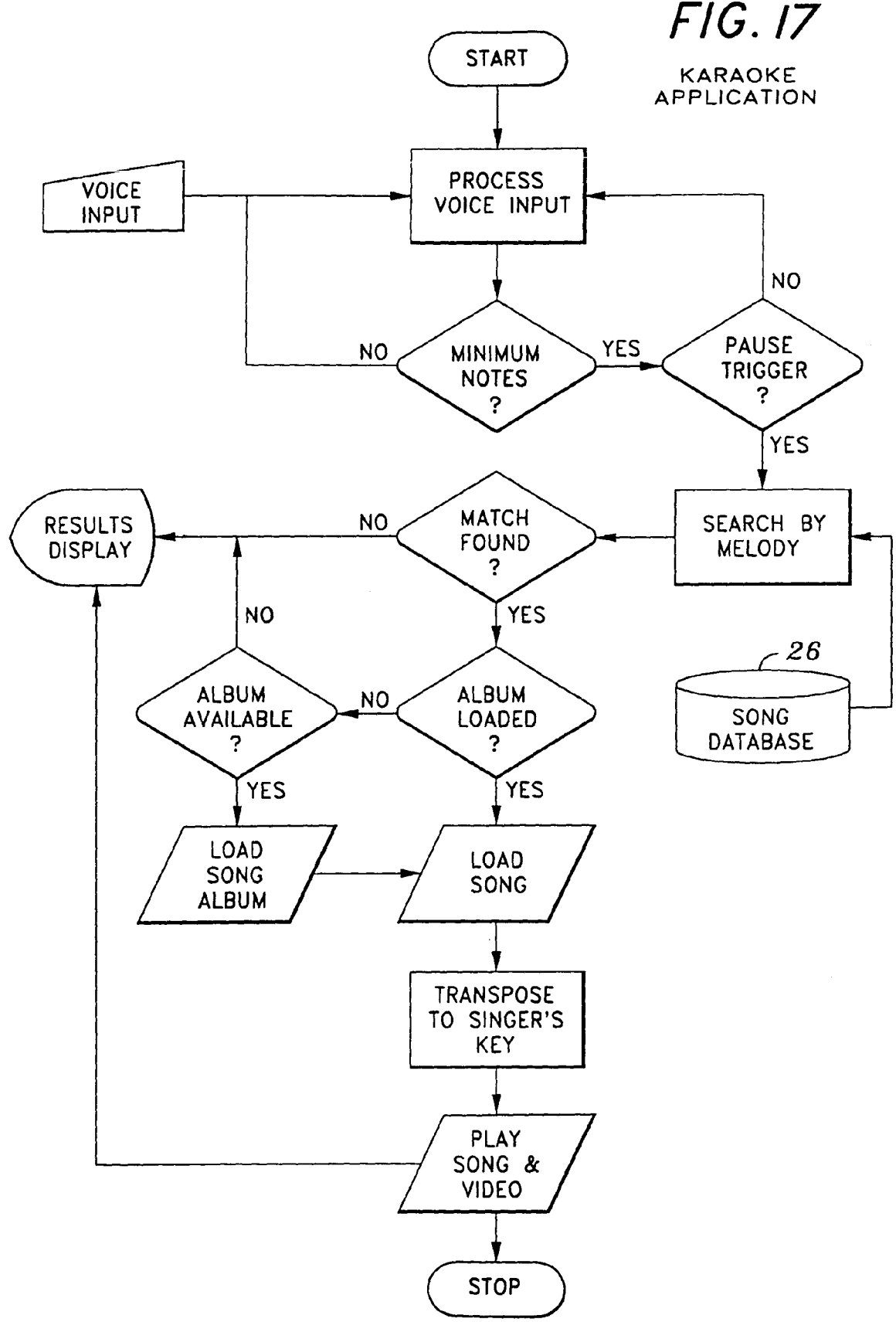

In accordance with the preferred embodiment of the present invention, the music search engine may be configured to be used in karaoke applications. Referring to FIG. 17, the karaoke application subroutine begins by processing the voice input of the user. As previously explained, the user will input his or her voice that will be processed and converted into musical notes. The music entered by the user will not be searched until a minimum number of notes have been input, and a pause of a default duration has been encountered. Once the notes have been entered into the system, the karaoke application subroutine will search for a matching song by melody. Specifically, the karaoke subroutine will begin the song search process as previously described by finding the difference argument string for the input note string and compare the same to the song database 26. If a match is not found, the karaoke subroutine will indicate such. In karaoke mode, the search engine can optionally return the closest match, regardless of the set threshold value. If a match is made between the notes entered by the user and a song in the song database 26, then the karaoke application determines if an album with the song is loaded in the karaoke machine. If an album is not loaded, then the karaoke application determines if an album is available and loads such. If the album is not available, then the karaoke application displays such results. Once the album is loaded, the song that matched the input note sequence is loaded from the album for playing and singing by the user. If the song is not in the correct key, then the karaoke application will transpose the song to the preferred key.

Automatic Transposition

Figure 18:
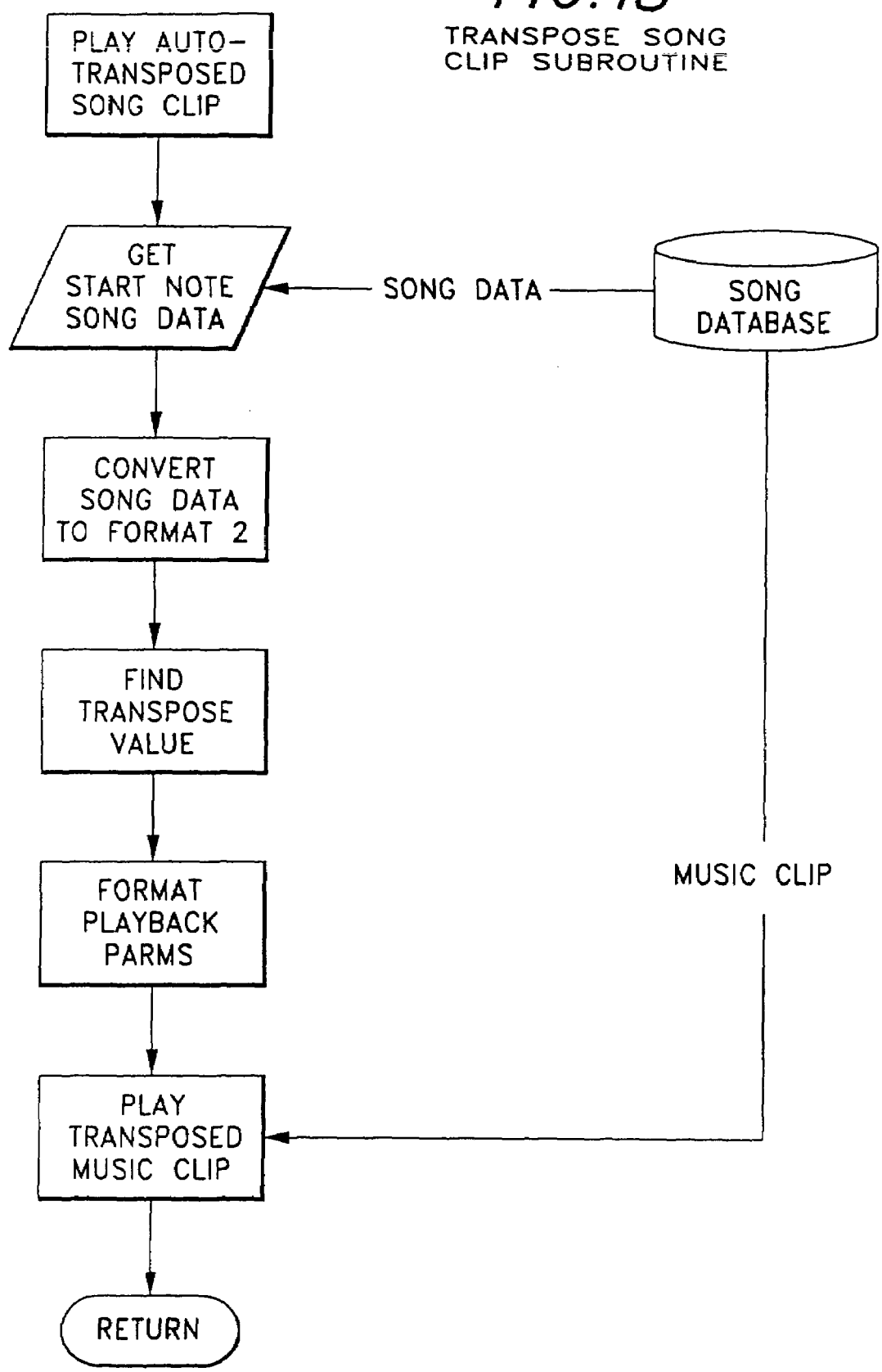

The music search engine of the present invention is ideally suited to transpose any song into the preferred key of the singer. In this respect, the music search engine is capable of transposing any karaoke song into the preferred key of the singer. Referring to FIG. 18, a transpose song clip subroutine will first retrieve the start note and song data of the matched song from the song database 26. Next, the song data is converted to Format-2, as previously described. Once the song data is converted from a difference sequence back to Format-2, a transpose value is determined for the selected song. The transpose value determines the amount of offset that should be applied to the song from song database 26 in order to place the song in the correct key for the singer. Once the transpose value is determined, the transpose song clip subroutine will format the play back parameters for the song and then play the transposed music clip. The transposed music clip will be the associated song from the song database 26, but will be in the correct key for the singer.

Find Transpose Value Subroutine

Figure 19:
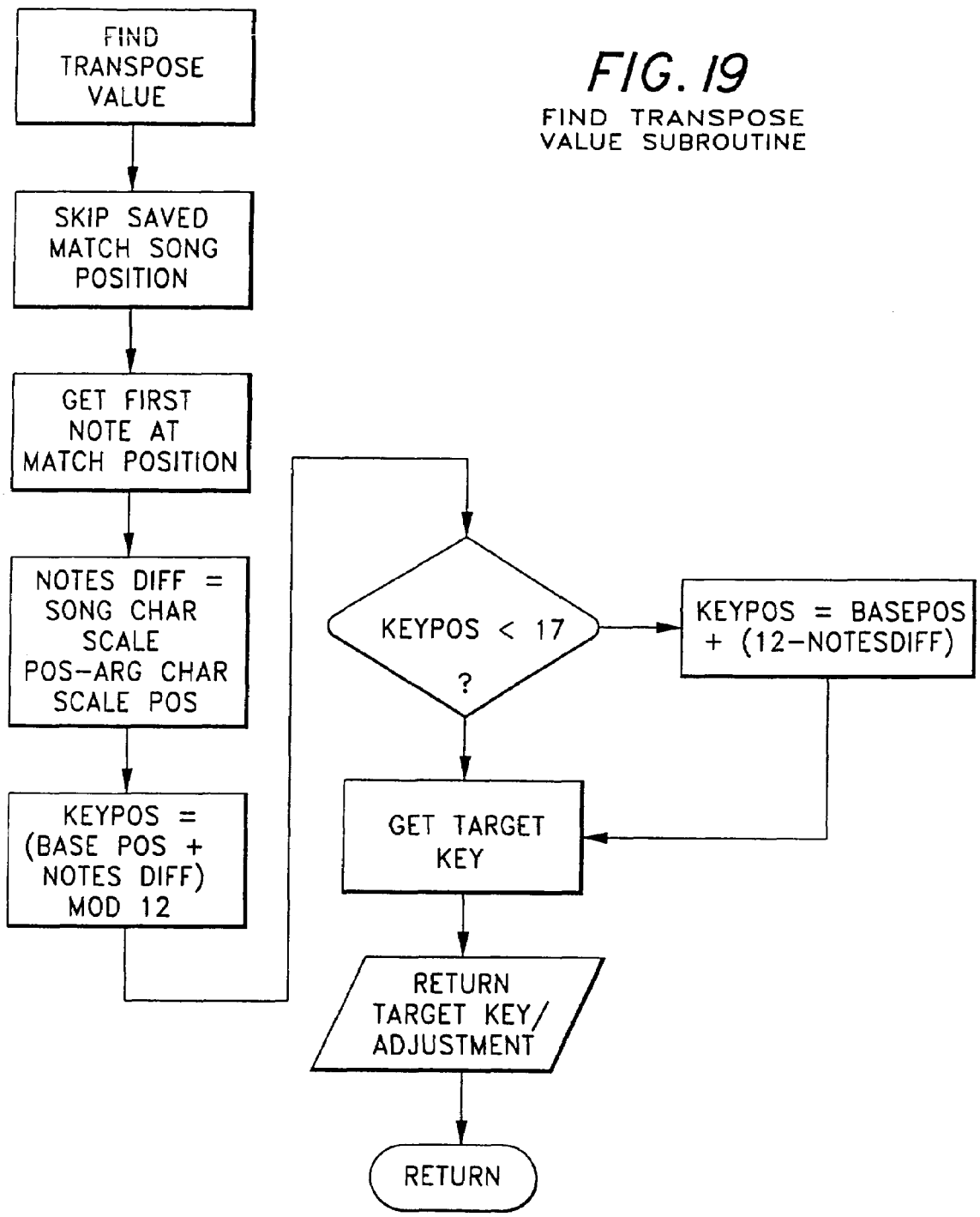

Referring to FIG. 19, the transpose value for the transpose song clip subroutine is determined by first finding the starting match position within the matched song (returned by the music search engine) that the user has sung. Next, the difference in note value (i.e., NotesDiff) between the first note of the matched song and the inputted note sequence is determined. The difference in notes is used to determine the difference in keys between the inputted notes and the matched song. Specifically, the key for the inputted note sequence is determined by computing: Mod 12(BasePos (i.e. first note)+ NotesDiff). If the key determination is less than 1, then the key position is equal to BasePos+(12−NotesDiff). Once the target key (i.e., the key for the new song) is determined, the target key and the adjustment to compensate for such is returned to the Transpose Song Clip subroutine shown in FIG. 18. The adjustment is a numerical value added to all of the notes of the matched song from the song database 26. Accordingly, the adjustment is a playback parameter that is applied to the matched song played by the karaoke machine. The song from the song database 26 is transposed by shifting the first note to the appropriate key. In this respect the adjustment value is added to the first note to start the song in the appropriate key. Since, the remainder of the notes from in the difference sequence rely on the first note, the remainder of the song will be in the correct key. Accordingly, the music search engine allows the song to be played in the key selected by the user.

Other Applications

It will be recognized by those of ordinary skill in the art that the music search engine has uses in many fields. By comparing the differences in notes between the input note sequence and the songs of the song database 26, tune search accuracy and speed are optimized. Additionally, storage requirements are reduced if song data that contains both shown below. Furthermore, differences in artistic expression or interpretation can be minimized during comparison.

The present invention has been described as being encoded with only information regarding the frequency (i.e. tone) of the note. However, it will be recognized, that the duration (i.e., timing) of the note may further be encoded. In such a scheme, each note is encoded as an eight bit ASCII character. The lower 5 bits will represent the change in twelfth-octave intervals from the previous note (i.e., the difference argument previously described). The upper 3 bits will represent the relative duration change in powers of two from −X/8 to +8X. The following table describes the timing relationships between adjacent notes, wherein X is the previous note:

| | | | |
|---|---|---|---|
| 000 | No Change | 100 | Unused |
| 001 | 2X | 101 | X/2 |
| 010 | 4X | 110 | X/4 |
| 011 | 8X | 111 | X/8 |

Any duration of a note that is smaller than the lower bound or higher than the upper bound will take the value of the lower/upper bounds respectively. If the note duration is between two values, then the duration will be rounded (i.e., quantized) to the nearest discrete level. By way of example only and not limitation, the tune "London Bridge is Falling Down" will be shown encoded below.

| | | | | | | |
|---|---|---|---|---|---|---|
| Conventional Encoding (in Key of 'C'): | | | | | | |
| G | A | G | F | E | F | G |
| D | E | F | E | F | G | |
| G | A | G | F | E | F | G |
| D | G | E | C | | | |
| Conventional Encoding (in Key of 'G'): | | | | | | |
| C | D | C | (<) | A# | A | A# (>) C |
| | (<) | G | A | A# | A | A# (>) C |
| C | D | C | (<) | A# | A | A# (>) C |
| | (<) | G | (>) | C | (<) | A  F |
| Preferred Encoding Method Frequency Change in Binary: | | | | | | |
| 00010 | 10010 | 10010 | 10001 | 00001 | 00010 | |
| 10101 | 00010 | 00001 | 10001 | 00001 | 00010 | |
| 00000 | 00010 | 10010 | 10010 | 10001 | 00001 | |
| 00010 | 10101 | 00101 | 10011 | 10011 | | |
| Preferred Encoding Method Timing Changes Only (X/8 to +8X) in Binary | | | | | | |
| 000 | 000 | 000 | 000 | 000 | 010 | |
| 110 | 000 | 010 | 110 | 000 | 010 | |
| 110 | 000 | 000 | 000 | 000 | 000 | |
| 111 | 010 | 000 | 110 | 000 | | |
| Preferred Encoding Method (Frequency Change and Duration) in Binary | | | | | | |
| 00000010 | 00010010 | 00010010 | 00010001 | 00000001 | 01000010 | |
| 11010101 | 00000010 | 01000001 | 11010001 | 00000001 | 01000010 | |
| 11000000 | 00000010 | 00010010 | 00010010 | 00010001 | 00000001 | |
| 11100010 | 01010101 | 00000101 | 11010011 | 00010011 | | |

As is evident from the above example, the first three bits from the encoded song represent the duration (i.e., timing changes) between adjacent notes and the last five bits represent the frequency changes between adjacent notes.

Some of the applications envisioned for the present invention include web-based music searching. As such, the web based music vendor can include the music search engine on their web site to offer customers an additional search option. Additionally, the music search engine will add marketing sizzle to help bring in potential customers. Further, the present invention may be used in the enforcement of copyrights on the web. Large music publishers and authorized distributors (such as Capitol Records and ASCAP) employ significant legal resources and research staff in monitoring copyright infringement. Custom applications could be developed whereby music on the web is "scanned" and compared to the publisher's database to find copyright violations.

The song database 26 contains a library of encoded music. The music may be encoded automatically by a computer, or may be manually encoded. It will be recognized, that songs in a digital format such as MIDI may be automatically encoded and stored within the song database 26 by a computer. In this regard, it would be an automatic process to encode a library of music for searching with the music search engine of the present invention.

The present invention has been described as being used for the input of musical notes and/or timing beats. However, it will be recognized that a search of words may be utilized to provide a corroborative search capability. In this respect, the music search engine may utilize voice recognition software to capture and convert the words to Soundex. Accordingly, the music search engine would utilize the sound captured by the voice recognition software to supplement the notes that shall be searched. This technique would be extremely useful as a supplementary search method after notes have been entered.

Additional modifications and improvements of the present invention may also be apparent to those of ordinary skill in the art. Thus, the particular combination of parts described and illustrated herein is intended to represent only a certain embodiment of the present invention, and is not intended to serve as limitations of alternative devices within the spirit and scope of the invention.

The invention claimed is:

1. A method for encoding music for searching, the method comprising the steps of:
   generating a database of a plurality of songs;
   assigning an index value for each note of at least a portion of each of a plurality of songs in the song database;
   generating a difference sequence by calculating a difference of the index values between successive notes of each of the plurality of songs;
   inputting a sequence of notes;
   assigning an index value for each note of at least a portion of the input sequence;
   generating an input difference argument by calculating a difference of the index values between every two successive notes of at least a portion of the input sequence; and
   searching the database to find the song with the difference sequence exactly matching the difference argument;
   comparing hit number of exact matches between the difference argument and the difference sequences of the songs in the database to a predetermined threshold number; and
   performing a near search when the hit number is smaller than the predetermined threshold number.

2. The method of claim 1, further comprising assigning a fraction of an octave as the index value to each note of the portion of each of the plurality of songs in the database and assigning a fraction of an octave as the index value to each note of the portion of the input sequence.

3. The method of claim 1, wherein the index value for each note of the portion of the input sequence and each song in the database includes a scale value and a duration.

* * * * *